US006770134B2

(12) United States Patent
Maydan et al.

(10) Patent No.: US 6,770,134 B2
(45) Date of Patent: Aug. 3, 2004

(54) METHOD FOR FABRICATING WAVEGUIDES

(75) Inventors: Dan Maydan, Los Altos Hills, CA (US); Arkadii V. Samoilov, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/866,172

(22) Filed: May 24, 2001

(65) Prior Publication Data

US 2002/0174826 A1 Nov. 28, 2002

(51) Int. Cl.$^7$ .............................................. C30B 23/04
(52) U.S. Cl. .......................... 117/89; 117/84; 117/103; 117/104
(58) Field of Search ........................ 117/84, 89, 103, 117/104

(56) References Cited

U.S. PATENT DOCUMENTS

| | | | | |
|---|---|---|---|---|
| 3,985,590 A | * | 10/1976 | Mason | 148/175 |
| 5,108,792 A | | 4/1992 | Anderson et al. | 427/248.1 |
| 5,194,079 A | | 3/1993 | Tumminelli et al. | 65/3.11 |
| 5,599,397 A | | 2/1997 | Anderson et al. | 118/728 |
| 5,682,455 A | | 10/1997 | Kovacic et al. | 385/131 |
| 5,698,890 A | * | 12/1997 | Sato | 257/592 |
| 5,714,777 A | * | 2/1998 | Ismail et al. | 257/263 |
| 5,810,924 A | | 9/1998 | Legoues et al. | 117/89 |
| 5,891,769 A | * | 4/1999 | Liaw et al. | 438/167 |
| 5,917,981 A | | 6/1999 | Kovacic et al. | 385/131 |
| 6,059,895 A | * | 5/2000 | Chu et al. | 148/33.1 |
| 6,154,475 A | | 11/2000 | Soref et al. | 372/45 |

FOREIGN PATENT DOCUMENTS

JP  08-186249  * 7/1996

OTHER PUBLICATIONS

Liu et al., "A surfactant–mediated relaxed Si Ge graded layer with a very low threading dislocation dneisty and smooth surface", Applied Physics Letter voluyme 75, No. 11 p. 1586–1588, Sep. 13, 1999.*

Y. Zuoya et al., "The Effects of Composition on the Spectral Loss Characteristics of SiGe Planar Waveguide Structures", Mat. Res. Soc. Symp. Proc. 281:461–465 (1993).

J. Schmidtchen et al., "Passive Integrated–Optical Waveguide Structures by Ge–Diffusion in Silicon", Journal of Lightwave Technology 12(5):842–848 (1994).

(List continued on next page.)

Primary Examiner—Robert Kunemund
(74) Attorney, Agent, or Firm—Pennie & Edmonds

(57) ABSTRACT

A method of forming a planar waveguide structure, comprising forming a first graded layer on a substrate, wherein the first graded layer comprises a first and a second optical material, wherein the concentration of the first optical material increases with the height of the first graded layer; forming a second graded layer on the first graded layer, the second graded layer comprising the first and second optical materials wherein the concentration of the first optical material decreases with the height of the second graded layer. The method further including forming a uniform layer on the first graded layer, the uniform layer containing first and second optical materials wherein the first optical material concentration is constant.

29 Claims, 16 Drawing Sheets

OTHER PUBLICATIONS

S. Janz et al., "Optical Properties of Pseudomorphic $Si_{1-x}Ge_x$ for Si-based Waveguides at the $\lambda$ = 1300-nm and 1550-nm Telecommunications Wavelength Bands", IEEE Journal of Selected Topics in Quantum Electronics 4(6):990–996 (1998).

M.T. Currie et al., "Controlling Threading Dislocation Densities in Ge on Si Using Graded SiGe Layers and Chemical–mechanical Polishing", Appl. Phys. Lett. 72(14):1718–1720 (1998).

B.L. Weiss et al., "Wavelength Dependent Propagation Loss Characteristics of SiGe/Si Planar Waveguides", Electronic Letters 28(24):2218–2220 (1992).

T. Hackbarth et al., "Alternatives to Thick MBE–grown Relaxed SiGe Buffers", Thin Solid Films 369:148–151 (2000).

H. Lafontaine et al., "Growth of Undulating $Si_{0.5}Ge_{0.5}$ Layers for Photodetectors at $\lambda$ = 1.55 $\mu$m", J. Appl. Phys. 86(3):1287–1291(1999).

A. Splett et al., "Integrated Optical Channel Waveguides in Silicon Using SiGe–alloys", SPIE, Physical Concepts of Materials for Novel Optoelectronic Device Applications II: Device Physics and Applications 1362:827–833 (1990).

S.P. Pogossian et al., "High–confinement SiGe Low–loss Waveguides for Si–based Optoelectronics", Appl. Phys. Lett. 75(10):1440–1442 (1999).

S.C. Greedy et al., "Fibre Coupling to SiGe Optoelectronic Devices", Post Graduate Research on Electronics and Photonics; IEE Proc.–Optoelectron. 147(6):391–394 (2000).

E.A. Fitzgerald et al., "Totally Relaxed $Ge_xSi_{1-x}$ Layers with Low Threading Dislocation Densities Grown on Si Substrates", Appl. Phys. Lett. 59(7):811–813 (1991).

M. Robillard et al., "Strain–induced Birefringence in $Si_{1-x}Ge_x$ Optical Waveguides", J. Vac. Sci. Technol. B 16(4):1773–1776 (1998).

M.R.T. Pearson et al., "SiGe–based Dual–wavelength Demultiplexers and Polarization Splitters", Part of the SPIE Conference on Silicon–based Optoelectronics, San Jose, California, SPIE 3630:29–39 (1999).

L. Liao et al., "Optical Transmission Losses in Polycrystalline Silicon Strip Waveguides: Effects of Waveguide Dimensions, Thermal Treatment, Hydrogen Passivation, and Wavelength", Journal of Electronic Materials 29(12):1380–1386 (2000).

S.P. Pogossian et al., "Analysis of High–confinement SiGe/Si Waveguides for Silicon–based Optoelectronics", J. Opt. Soc. Am. A 16(3):591–595 (1999).

B. Schüppert et al., "Integrated Optics in Silicon and SiGe–Heterostructures", Journal of Ligthwave Technology, IEEE 14(10):2311–2323 (1996).

J.C. Campbell, "Optoelectronics in Silicon and Germanium Silicon", *Germanium silicon: physics and materials, semiconductors and semimetals*, edited by R. Hull et al. 56:347–386, Academic Press (1999).

U. Fischer et al., "Optical Waveguide Switches in Silicon Based on Ge–Indiffused Waveguides", IEEE Photonics Technology Letters 6(8):978–980 (1994).

B. Li et al., "2 x 2 Optical Waveguide Switch with Bow–Tie Electrode Based on Carrier–Injection Total Internal Reflection in SiGe Alloy", IEEE Photonics Technology Letters 13(3):206–208 (2001).

* cited by examiner

METHOD FOR FABRICATING WAVEGUIDES

The present invention relates generally to fabricating planar waveguide structures, and particularly to fabricating silicon germanium (SiGe) waveguide structures.

BACKGROUND OF THE INVENTION

The advent of the information age has seen an increasing drive toward extremely high-speed applications, leading to an increasing use of optical circuits in communication systems. Planar optical waveguides are widely used as components in optical communication systems. A typical planar waveguide structure comprises a lower cladding region, a light guiding core region and an upper cladding region. The light guiding core region has a higher index of refraction than either the lower or the upper cladding regions.

SiGe waveguides are of particular interest because both optical and electronic devices can be integrated on a single silicon substrate. Silicon is a well established substrate for electronic circuits, and high quality silicon is readily available at low cost. Additionally, both Si and SiGe are transparent in the 1300 nm and 1500 nm telecommunications wavelengths and further, SiGe has a higher index of refraction than Si. Finally, the optical and electrical properties of SiGe waveguides can be adjusted by varying the Ge concentration.

Although, SiGe waveguide structures are desirable for their electrical and optical properties, several problems exist with fabricating low loss SiGe waveguides. Generally, a SiGe waveguide structure comprises a lower cladding primarily composed of silicon, a silicon germanium core and an upper cladding also composed primarily of silicon. The lattice constant of Ge is 4% larger than that of Si. Thus, when SiGe is grown on pure silicon, this difference in lattice constants may cause very high misfit and threading dislocation densities in the structure. These dislocations may lead to increased optical losses in the waveguide structure.

Moreover, in a typical SiGe waveguide structure, the distribution of Ge in the vertical direction is different from the distribution of Ge in the horizontal direction. This asymmetry leads to birefringence effects. Generally, a light wave traveling down a waveguide comprises two orthogonally polarized modes, one perpendicular to the substrate and the other parallel to the substrate. In conventional SiGe waveguide structures, the perpendicular mode sees a different index of refraction from the parallel mode, leading to a dispersion of the transmitted signal.

Additionally, waveguide structures used for optical telecommunications typically require core thicknesses in the range of 2–10 µm. Current methods of producing SiGe waveguide structures are very slow and impractical for growing SiGe waveguide structures of such thicknesses. Further, such slow growth processes may increase the amount of contaminants in the waveguide structure. These contaminants may also contribute to optical losses in the waveguide structure.

Therefore, there is a need in the art for a low loss SiGe waveguide fabrication process that is suitable for large scale production of SiGe waveguide structures.

SUMMARY OF THE INVENTION

There are several embodiments of the invention.

In one embodiment of the invention, a method of forming a planar waveguide structure comprises forming a first graded layer on a substrate, wherein the first graded layer comprises a first and a second optical material, wherein the concentration of the first optical material increases with the height of the first graded layer; and forming a second graded layer on the first graded layer, the second graded layer comprising the first and second optical materials wherein the concentration of the first optical material decreases with the height of the second graded layer. The method may also include forming a blocking layer between the substrate and the first graded layer and forming an upper cladding layer over the second graded layer.

In one embodiment, the method may also include forming a uniform layer between the first and second graded layers, the uniform layer containing first and second optical materials wherein the concentration of the first optical material is constant. In another embodiment, the uniform layer is formed directly over the substrate and a cladding layer may be formed directly over the uniform layer. This embodiment may also include a blocking layer between the substrate and the uniform layer. In yet another embodiment, a uniform layer is formed directly over the substrate, a graded layer is formed immediately over the uniform layer and a cladding layer is optionally formed over the graded layer.

In one embodiment, the first optical material is germanium and the second optical material is silicon. In one embodiment, the blocking layer, the first and second graded layers, the uniform layer and/or the cladding layer are formed epitaxially.

Optionally, the method also includes etching a pattern in the substrate and then forming the blocking layer, graded layers and uniform layer, if used, so as to conform to the shape of the pattern.

In another embodiment, the etching step is performed after the first graded layer and the uniform layer are formed. In this embodiment, the pattern is etched into the uniform layer and the first graded layer and the second graded layer is then formed over the patterned etched layers. In embodiments that do not contain the uniform layer, the pattern is etched into the first graded layer and then the second graded layer is formed over the etched patterned first graded layer. In embodiments that do not contain the first or second graded layers, the pattern is etched in the uniform layer, and an upper cladding layer is optionally formed on the etched patterned uniform layer.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
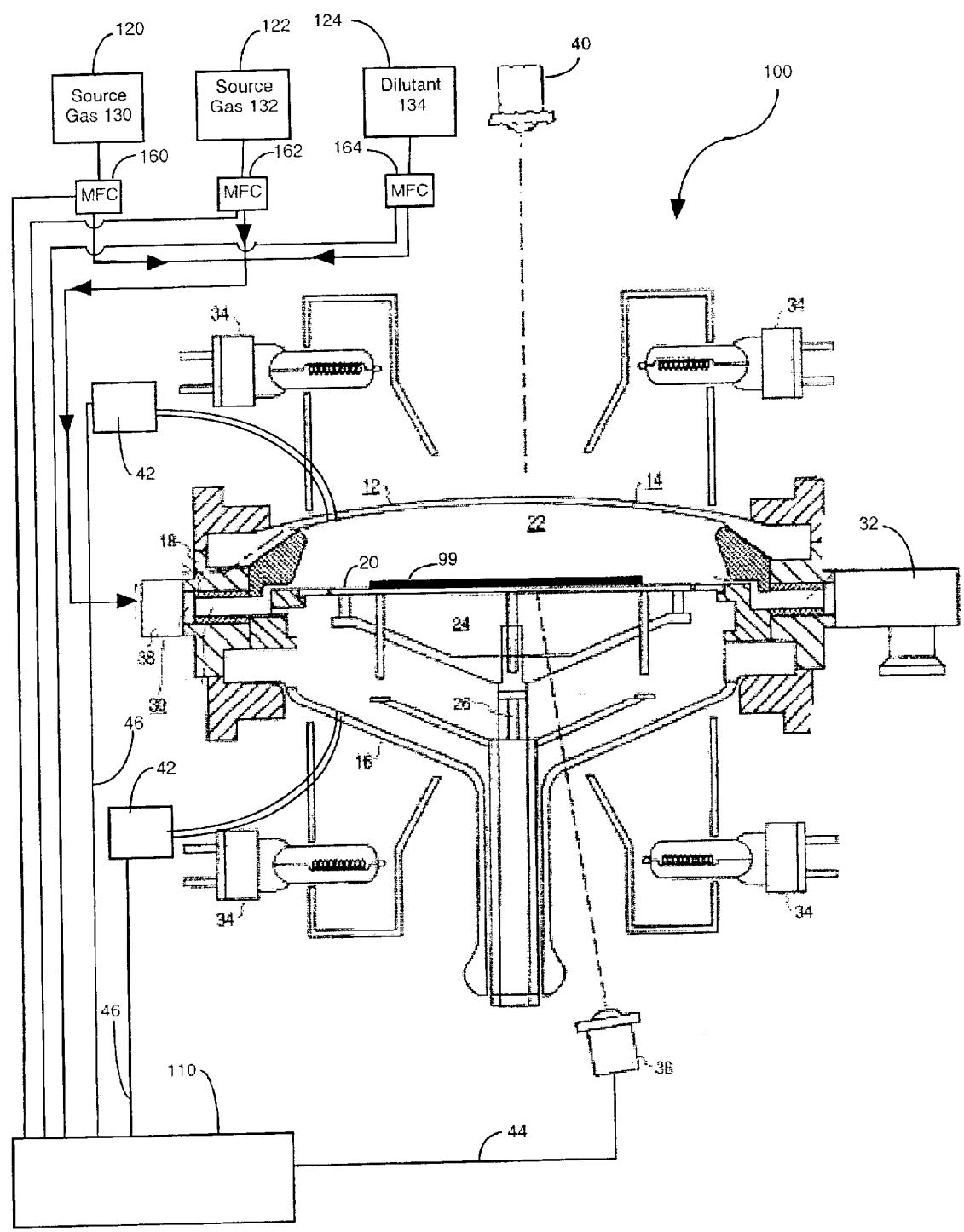
FIG. 1 is a diagram of an exemplary reactor that may be used to implement the present invention.

FIG. 1 shows a reactor 100 that may be used to fabricate waveguides in accordance with the invention. Reactor 100 may be a commercially available deposition system, such as the EPI Centura system available from Applied Materials, Inc. of Santa Clara, Calif., modified according to the invention described. It is to be appreciated that the invention is not limited to an EPI Centura system but can be accommodated by other deposition systems.

Reactor 100 comprises a deposition chamber 12 having an upper dome 14, a lower dome 16 and a side wall 18. Within chamber 12 is a susceptor 20 which extends transversely across chamber 12 dividing chamber 12 into an upper portion 22 above susceptor 20 and a lower portion 24 below susceptor 20. A wafer 99 is supported on the upper surface of susceptor 20. Susceptor 20 is mounted on a shaft 26 that is connected to a motor used to rotate shaft 26, susceptor 20 and wafer 99 thereon.

An inlet manifold 30 in side wall 18 admits one or more gases into chamber 12. An outlet port 32 in side wall 18 opposite the inlet manifold is used to exhaust gases from chamber 12. A plurality of high intensity lamps 34 mounted around chamber 12 direct their light through the upper and lower domes onto susceptor 20 to heat susceptor 20 and wafer 99 thereon. Lower and upper pyrometers 36 and 40 are used to monitor the temperature of chamber 12. The pressure in chamber 12 is monitored by one or more pressure sensors 42 and regulated by, for example, controlling a vacuum source and a pressure control valve.

A processor 110 controls the temperature and pressure inside chamber 12. Processor 110 can be a computer chip incorporated into reactor 100 or may be a separate digital computer having executable program instructions. Pyrometers 36 and 40 are coupled to processor 110 thru lines 44. Processor 110 uses received information about the substrate temperature to control heat lamps 34, thereby controlling the substrate temperature. The one or more pressure sensors 42 are also coupled to processor 110 by lines 46. Processor 110 uses received information about the chamber pressure to control the pressure by, for example, controlling a vacuum source and a pressure control valve coupled to chamber 12.

FIG. 1 further shows a gas supply system used to introduce constituents into deposition chamber 12. In one embodiment, the system includes at least two source gas supplies 120 and 122 and a dilutant/inert gas supply 124. Processor 110 controls the introduction of each source gas and the dilutant/inert gas through manifold 30 and controls the flow of each gas through variable flow rate mass flow controllers 160, 162 and 164. The source gases and the dilutant gas can be mixed in chamber 12 or, preferably, pre-mixed before entering chamber 12, as shown in FIG. 1. Preferably, the first source gas is a Si source gas, the second source gas is a Ge source gas and the dilutant gas is hydrogen.

Figure 2:
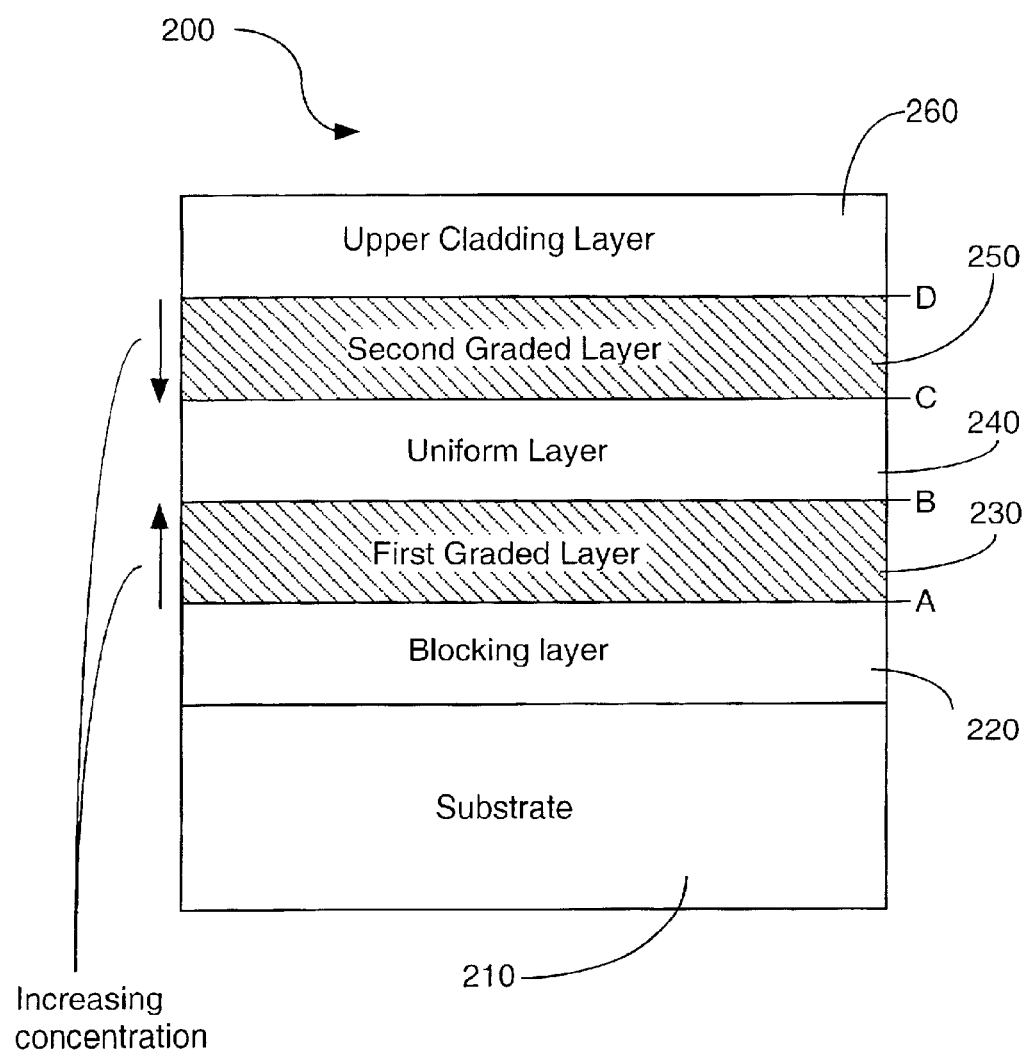
FIG. 2 illustrates a waveguide structure that may be fabricated in accordance with an embodiment of the invention.

FIG. 2 illustrates schematically a waveguide structure 200 that may be fabricated in accordance with an embodiment of the invention. In this embodiment, waveguide structure 200 comprises a substrate 210, a blocking layer 220 formed over substrate 210, and a first graded layer 230 formed over blocking layer 220. Waveguide structure 200 further includes a uniform layer 240 formed over the first graded layer 230, a second graded layer 250 formed over uniform layer 240 and an upper cladding layer 260 formed over the second graded layer 250. Graded layers 230 and 250 have an index of refraction that varies monotonically with the height of each layer. In particular, the index of refraction increases with height in layer 230 and decreases with height in layer 250.

The first and second graded layers, 230 and 250, and the uniform layer 240 are composed of a first and second optical materials. The two optical materials are selected such that the index of refraction of the resulting layer varies as the relative concentrations of the two materials changes. In one embodiment of the present invention, the first optical material is a silicon source material and the second optical material is an index of refraction adjusting material, such as germanium. The index of refraction of a SiGe layer is a function of the concentration of Ge in the SiGe layer and increases as the concentration of Ge in the layer increases, e.g. a SiGe layer containing 4% Ge will have a higher index of refraction than a SiGe layer containing 2% Ge. The index of refraction of a SiGe layer is adjusted by varying the concentration of Ge in the gases introduced into reactor 100.

Substrate 210 is any substrate suitable for chemical vapor deposition, such as for example a silicon substrate. Most commercially available substrates contain some amounts of contaminants. During formation of the waveguide structure, these contaminants may diffuse into the waveguide structure and contribute to optical losses in the resulting waveguide structure.

A blocking layer 220 is used to prevent contaminants from substrate 210 from diffusing into layers 230, 240, 250, 260 during the formation of the waveguide structure. The thickness of the blocking layer 220 is dependent on the amounts of contaminants in the substrate. If substrate 210 contains high levels of contaminants, a thick blocking layer 220 may be needed. If the level of contaminants is low, then a thin layer 220 will suffice. The blocking layer 220 can be any suitable material that prevents contaminant diffusion and has a lower index of refraction than that of the first graded layer 230 at interface A. The blocking layer 220 may be, for example, epitaxial silicon. The blocking layer 220 may not be necessary where the substrate 210 is pure or contains negligible amounts of contaminants.

As stated above, the first graded layer 230 comprises two optical materials and the concentration of the first optical material increases with the height of the graded layer. The height is measured along a perpendicular to the substrate 210 from the interface of the blocking layer 220 and the first graded layer 230 to the interface of the first graded layer 230 and the uniform layer 240. In one embodiment, the concentration profile along a perpendicular to substrate 210 varies in a linear fashion (see FIG. 3(a)). However, other embodiments where the concentration profile varies in a non-linear fashion are also contemplated (See for example FIGS. 3(d)–3(f)).

In an embodiment of the invention that includes a uniform layer 240, the uniform layer 240 comprises the same two optical materials as used for forming the graded layers, 230 and 250. However, the relative concentrations of the two materials remains constant throughout uniform layer 240. In one embodiment, the relative concentrations of the two materials is the same as the concentration at interfaces B and C of the first and second graded layers 230 and 250, respectively. In other embodiments, the concentrations are selected such that the index of refraction of the uniform layer is higher than both the index of refraction of the first graded layer 230 at interface B and the index of refraction of the second graded layer 250 at interface C.

The second graded layer 250 comprises the same two optical materials used to form the first graded layer 230 and the uniform layer 240, but the concentration of the first optical material decreases with the height of the second graded layer 250. The height is measured along a perpendicular to the substrate from the interface of the uniform layer 240 and the second graded layer 250 to the interface of the second graded layer 250 and the upper cladding layer 260. In one embodiment, the concentration profile along a perpendicular to the substrate varies in a linear fashion (see FIG. 3(a)). However, other embodiments, as described later in connection with FIG. 3, where the concentration profile varies in a non-linear fashion are also contemplated (FIGS. 3(d)–3(f)).

In one embodiment, the concentration profiles of the first and second graded layers are symmetric, i.e. the rate of decrease of germanium concentration in the second graded layer 250 is the same as the rate of increase of germanium concentration in the first graded layer 230. Other embodiments where the concentration profiles of the first and second graded layers are not symmetric are also contemplated.

The upper cladding layer is used to confine a light beam propagating in the first graded layer 230, the second graded layer 240, and the uniform layer 250 to the layers 230, 240 and 250. The material for the upper cladding layer is any suitable material with an index of refraction less than that of layers 230, 240, and 250. Preferably, the index of refraction of the upper cladding layer is the same as the index of refraction of the substrate. Preferably, the upper cladding layer is composed of the same material as the substrate 210. The thickness of the cladding layer is selected such that a light beam traveling in layers 230, 240 and 250 effectively sees a cladding layer of infinite thickness. Preferably, the cladding layer thickness is in the range of about 1–20 μm.

In one embodiment, the waveguide structure 200 does not include the upper cladding layer 260. In this case, the air confines a light beam to layers 230, 240 and 250. In another embodiment, waveguide structure 200 does not include a blocking layer. In yet another embodiment, the waveguide structure 200 does not include uniform layer 240. In this structure, the second graded layer is formed immediately over the first graded layer.

In other embodiments, the waveguide structure 200 does not include first and second graded layers. Rather, the structure 200 comprises a substrate 210 and a uniform layer 240 formed immediately over substrate 210. Such structure 200 may further include a blocking layer 220 and an upper cladding layer 260. Preferably, layers 220 and 260 are composed primarily of epitaxial silicon.

In one embodiment, the two optical materials are Si and Ge. In this case, layer 210 is any substrate suitable for Si and Ge deposition. Preferably, the substrate is a silicon substrate. Optionally, a blocking layer is formed on the substrate and comprises epitaxial silicon. The thickness of the blocking layer is typically in the range of about 0–10 μm. A first graded layer 230 is formed on the blocking layer and comprises Si and Ge. In this embodiment, the Ge concentration in the first graded layer increases linearly with height as shown in FIGS. 3(a) and 3(c). Other Ge concentration profiles, such as those illustrated in FIGS. 3(d)–3(f), are also contemplated.

In this embodiment, the germanium concentration at interface A is about 0% and the germanium concentration at interface B is about 2–5% and increases with the height of the layer, i.e. increases linearly along a perpendicular to the substrate. Typically, the Ge concentration in the first graded layer 230 ranges from about 0% to about 5% and increases at a rate between about 0.1% per μm to about 10% per μm of the height of the graded layer 230. In one embodiment, the Ge concentration in the graded layer 230 increases from about 0% at interface A to about 2% at interface B at a rate of about 5–10% per μm, resulting in a graded layer 230 that is about 0.2–0.4 μm, thick.

In this embodiment, the Ge concentration in the uniform layer 240 is in the range of about 2–5% and the uniform layer thickness is in the range of about 2–5 μm. Preferably, the Ge concentration in the uniform layer 240 is the same as the Ge concentration at interfaces B and C of the first and second graded layers 230 and 250, respectively. In another embodiment, the Ge concentration in the uniform layer 240 is higher than the Ge concentration at interfaces B and C of the first and second graded layers 230 and 250, respectively. Thus, in this embodiment, the index of refraction of the uniform layer 240 is higher than the index of refraction of layers 230 and 250 at interfaces B and C respectively.

The second graded layer 250 comprises Si and Ge where the Ge concentration decreases with the height of the second layer 250. The Ge concentration in the second graded layer 250 is in the range of about 5% to about 0% and decreases at a rate between about 0.1% per μm to about 10% per μm of the height of the second graded layer 250. In one embodiment, the Ge concentration decreases from about 2% at interface C to about 0% at interface D at a rate of about 5–10% per μm, resulting in a second graded layer 250 that is about 0.2–0.4 μm thick. Preferably, the concentration profile and the thickness of the first graded layer 230 is symmetrical to the concentration profile and thickness of the second graded layer 250. Preferably, an upper cladding layer 260, composed primarily of epitaxial silicon, is formed on the second graded layer 250.

Figure 3:
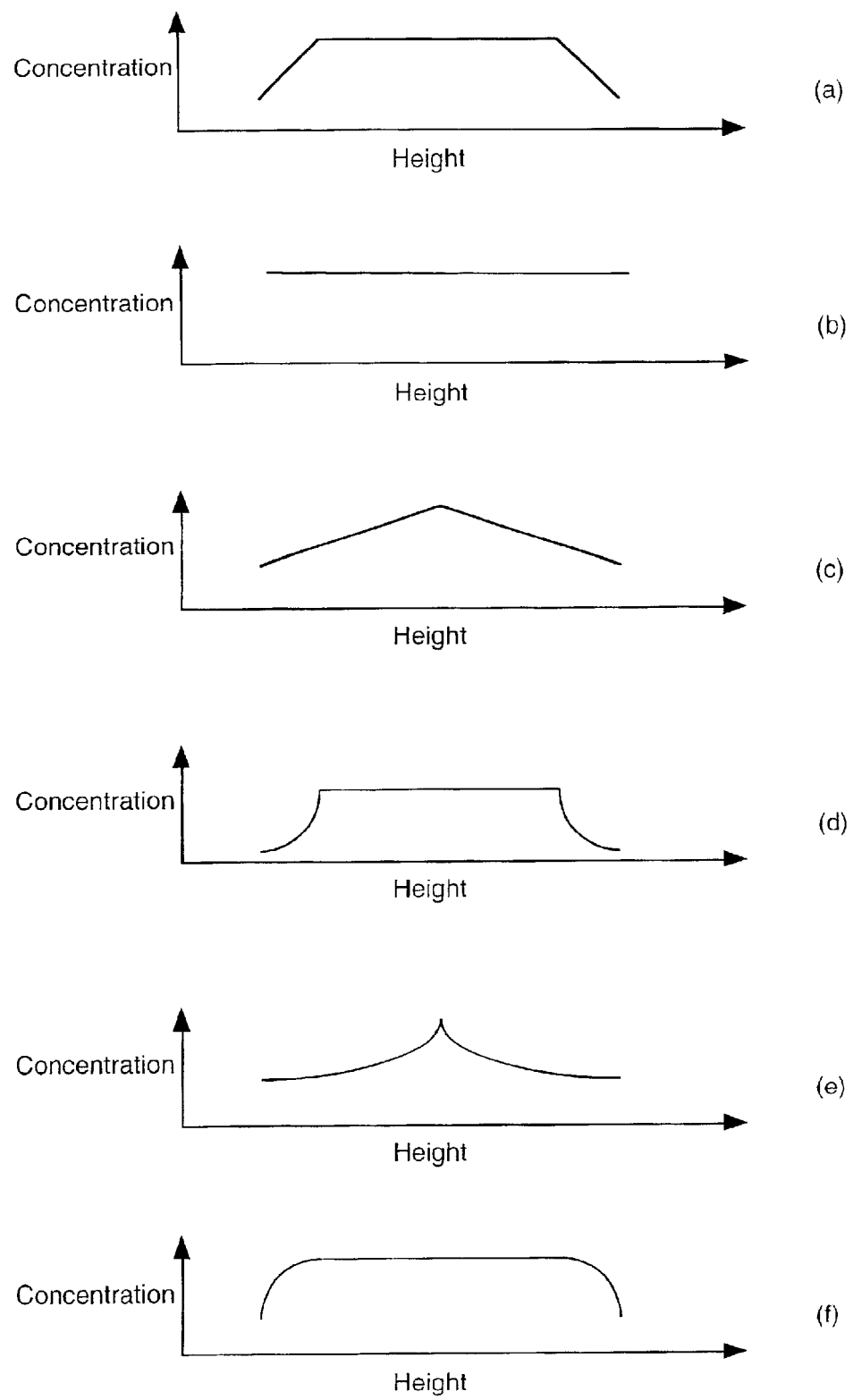
FIG. 3 illustrates concentration profiles of waveguide structures fabricated in accordance with the invention.

FIG. 3 illustrates concentration profiles that may be used to fabricate waveguide structures in accordance with one embodiment of the invention. FIGS. 3(a), (d) and (f) show concentration profiles of a first optical material, e.g. Ge, for exemplary waveguide structures 200 in accordance with three embodiments of the invention that employ a uniform layer 240. In these embodiments, the concentration of the first optical material increases monotonically with height in the first graded layer 230, the concentration remains constant in the uniform layer 240 and the concentration decreases monotonically with height in the second graded layer 250. Optionally, a blocking layer 220 is formed before the first graded layer 230 is formed. These embodiments may also contain an upper cladding layer 260 over the second graded layer 250.

FIG. 3(b) shows the concentration profile where the structure contains only a uniform concentration layer on substrate 210. This embodiment does not contain first or second graded layers. In this embodiment, the uniform layer 240 is formed directly over substrate 210. The structure may optionally contain a blocking layer between the substrate 210 and the uniform layer 240 and/or an upper cladding layer over uniform layer 240. FIGS. 3(c) and (e) illustrate concentration profiles of structures that do not contain a uniform layer. In these embodiments, the second graded layer 250 is formed directly over the first graded layer 230. Optionally, a blocking layer 220 is formed before the first graded layer 230 is formed. The structure 200 may also contain an upper cladding layer 260 over the second graded layer 250.

Figure 4:
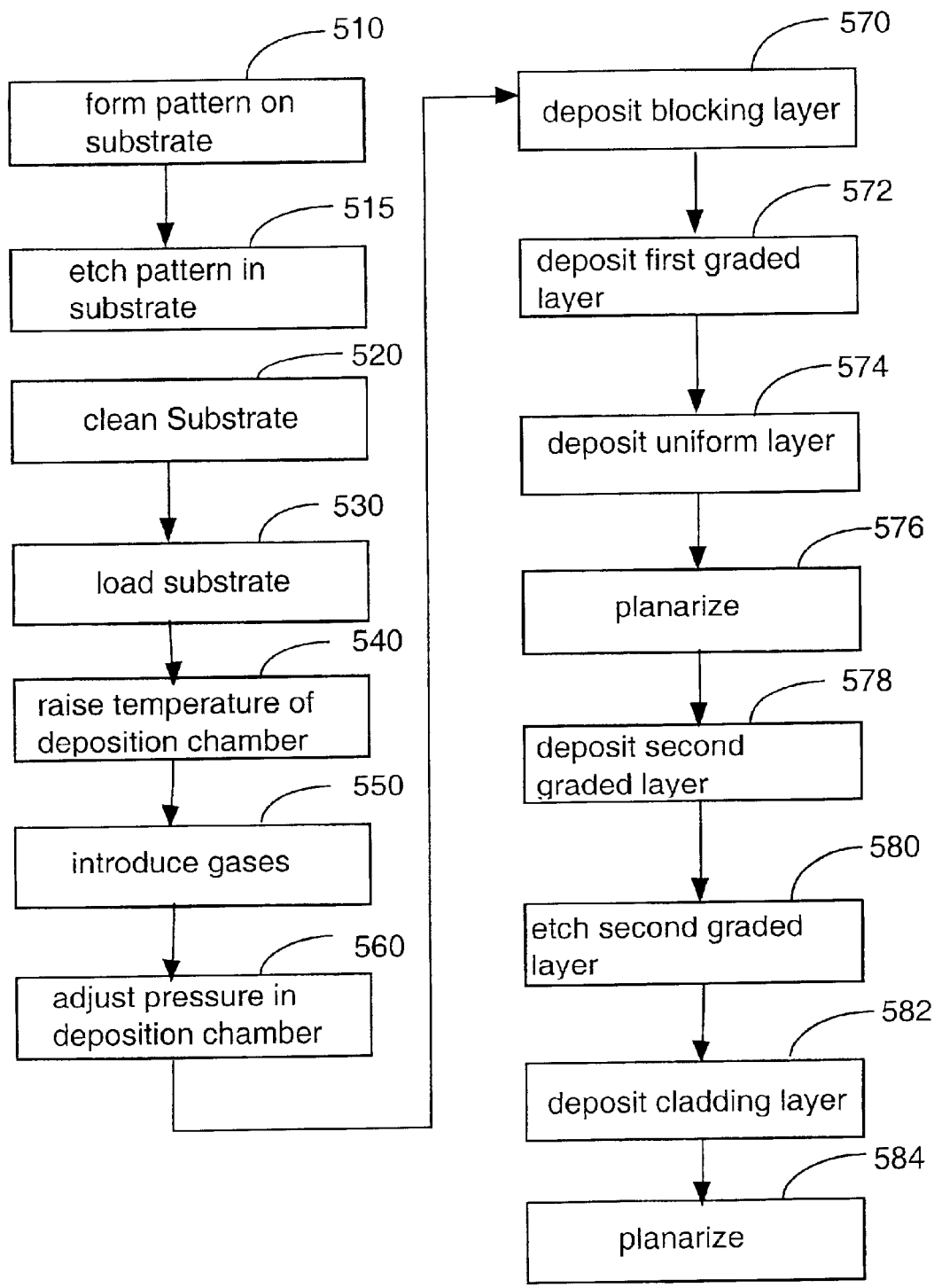
FIG. 4 is a flow chart of the processing steps used to fabricate waveguide structures in accordance with an embodiment of the invention.
Figure 5:
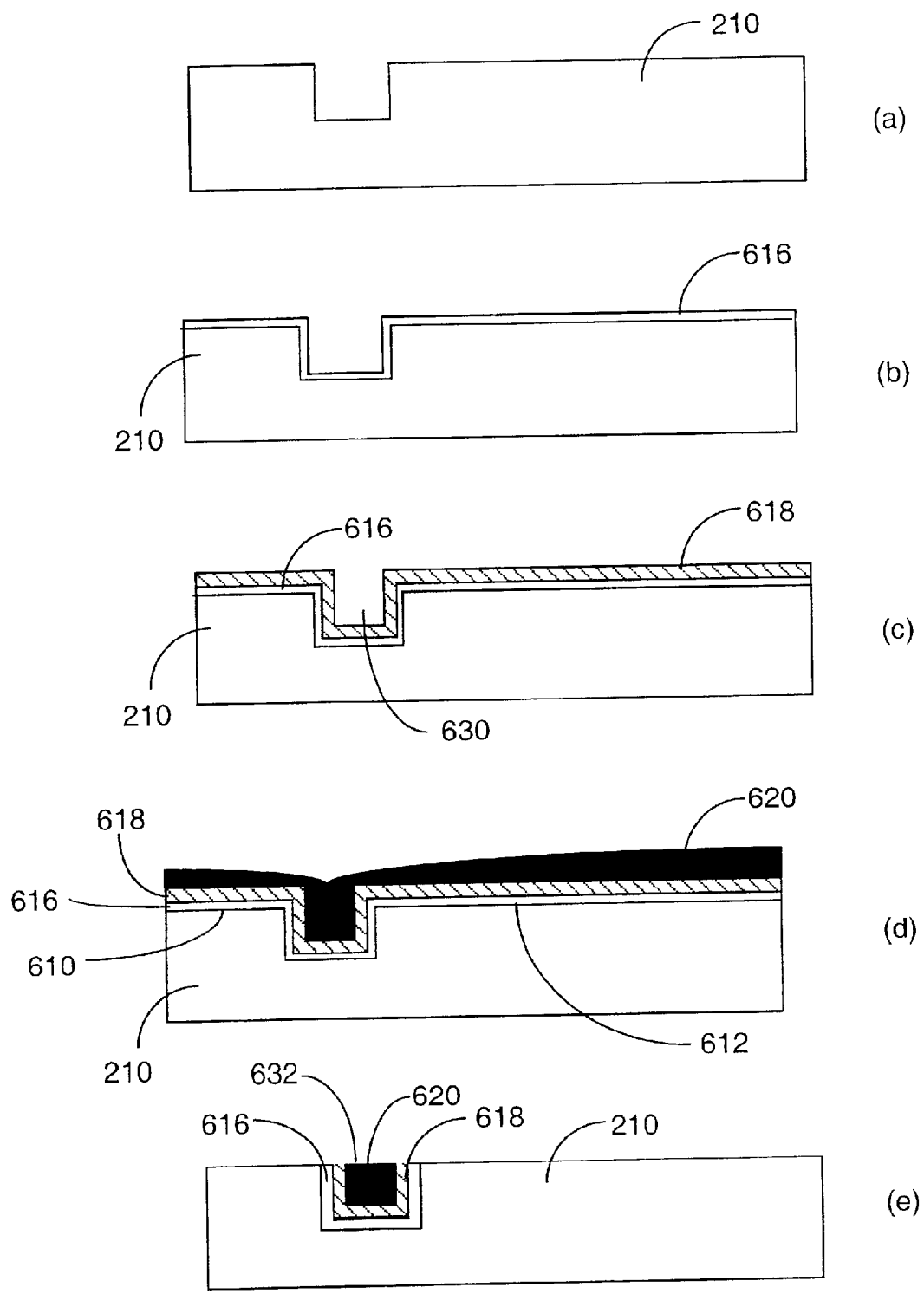
FIG. 5 illustrates schematic cross sections of the waveguide structure at some of the processing steps of FIG. 4.
Figure 5:
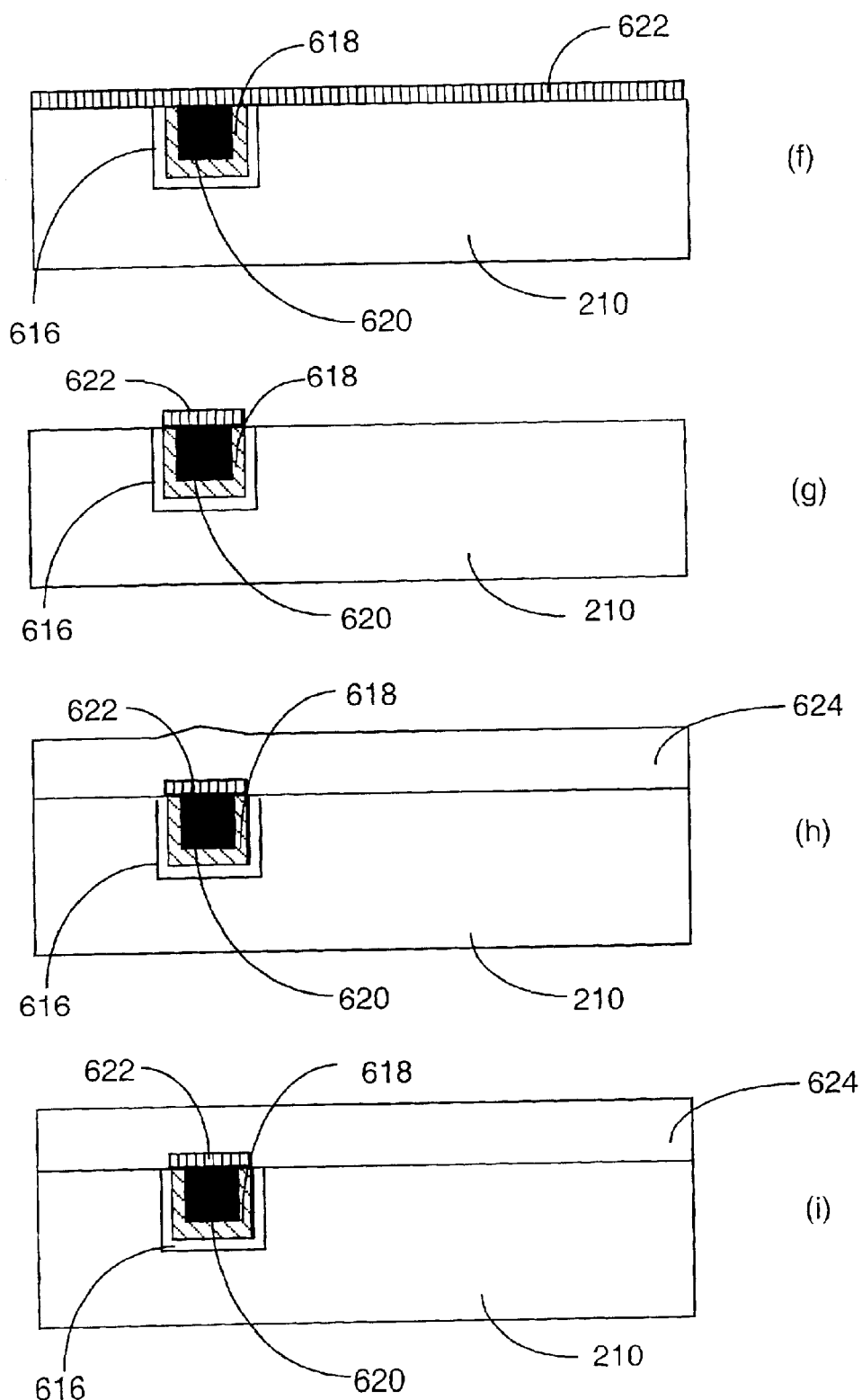

FIGS. 4 and 5 illustrate the processing steps used to fabricate waveguide structure 200 in accordance with an embodiment of the invention. Waveguide structure 200 is fabricated using a chemical vapor deposition (CVD) process, preferably, a low pressure chemical vapor deposition (LPCVD) process.

First, a predetermined pattern 611 is formed on a substrate 210 using standard photolithographic techniques known in the art (Step 510). The substrate 210 is any substrate suitable for opto-electronic device fabrication, preferably Si. Next, the pattern is etched in the substrate 210 using etching techniques known in the art. (Step 515, FIG. 5(a)) The substrate surface is then cleaned to remove contaminants, such as native oxides that are formed when the surface of the substrate is exposed to air, prior to placing the etched substrate 210 in the deposition chamber 12. (Step 520). In one such cleaning technique, the substrate is pre-processed by dipping it in a water-based hydroflouric acid solution. The wafer is then placed in the deposition chamber and baked at about 900° C. for approximately one minute.

Where lower temperatures are desired, a dedicated pre-clean chamber such as the one used in the Epi Centura system available from Applied Materials of Santa Clara, Calif., may be used to perform the cleaning step. In this case, the wafer is first dipped in a water-based solution of hydroflouric acid. Next, the wafer is placed in the pre-clean chamber and baked at a first temperature for a predetermined time interval and then baked at a second temperature for a second predetermined time interval. In one instance, the first bake is performed at about 750° C.–770° C. and the second bake is performed at temperatures in the range of about 770° C.–795° C.

The cleaned substrate 210 is then loaded on susceptor 20 between domes 14 and 16 (Step 530). Next, chamber 12 is heated to the desired temperature using the high intensity lamps 34. (Step 540). Preferably, chamber 12 is heated to a temperature between about 550° C. and 1200° C. More preferably, chamber 12 is heated to about 850° C.–1000° C. The first and second source gases 130 and 132 and dilutant gas 134 are next introduced into chamber 12. (Step 550). The pressure in chamber 12 is then adjusted until the desired pressure is reached. (Step 560). For low pressure CVD, the pressure in chamber 12 is maintained below 760 Torr. Although Steps 540, 550 and 560 have been described as having been performed in a particular sequence, those skilled in the art will recognize that these steps may be performed in any order.

After the desired pressure and temperature are reached, a series of layers are formed by CVD on substrate 210. Processor 110 controls the introduction of first and second source gases, 130 and 132, used to form films on substrate 210, such as the blocking layer 616 (FIG. 5(b), graded index films 618, 622 (FIGS. 5(c) and 5(f)), uniform index film 620 (FIG. 5(d)), and the upper cladding layer 624 (FIG. 5(h)). To fabricate a SiGe waveguide, the first source gas 130 is any suitable source gas that is used for forming silicon films, for example silane, disilane, trisilane, dichlorosilane or trichlorosilane. The second source gas 132 is any source gas used to form germanium films that is compatible with the first source gas 130, for example germane ($GeH_4$) or digermane. Preferably, the first source gas 130 is silane ($SiH_4$) and the second source gas 132 is 1% of germane ($GeH_4$) in $H_2$.

The flow rate of a species into the deposition chamber is one of the factors that determines the growth rate of a layer of film deposited on the substrate. For example, the flow rate of silane determines the growth rate of a silicon layer on substrate 210. These flow rates are regulated by mass flow controllers 160, 162, and 164 that, in turn, are controlled by processor 110 so as to form a desired thickness of each layer. One method for determining the appropriate flow rate of a species and deposition time is described in greater detail below.

In the case of a SiGe waveguide, processor 110 controls the introduction of silane, germane and hydrogen through mass flow controllers 160, 162 and 164, respectively. For the deposition of the silicon blocking layer 616 (step 570), processor 110 sets mass flow controller 160 in the range of about 10–500 standard cubic centimeters per minute (sccm) of silane unit and sets mass flow controller 164 in the range of about 5–70 standard liter per minute (slm) of hydrogen unit. Preferably, processor 110 sets mass flow controller 160 to about 50 sccm of silane unit and mass flow controller 164 at about 30–40 slm.

A first graded SiGe layer 618 is next formed by CVD over blocking layer 616. (Step 572, FIG. 5(c)). Any suitable germanium source gas that is compatible with the silicon source gas may be used to form the first graded layer 618, such as commercially available germane or digermane diluted to a suitable concentration. Preferably, silane and 1% germane in $H_2$ are used to form the first graded SiGe layer 618. In one embodiment, the silane and hydrogen flow rates are maintained at a constant flow rate while the germane mixture flow rate is increased from 0 sccm to 500 sccm of germane mixture (1% germane in $H_2$) units based on the desired Ge concentration gradient and the desired final Ge concentration in the first graded layer 618.

The concentration change of a species, such as germanium, over a height of a film may be accomplished at the mass flow controller 162 by changing the flow rate of the source gas 132 into the chamber 12. However, a linear flow rate change does not necessarily produce a linear concentration gradient of the species in the formed film. Particularly in the case of germane, a linear increase or decrease of the flow rate of germane does not generally result in a linear change in the concentration of Ge in the formed film. Thus, to achieve a linear concentration profile in the formed film, processor 110 controls mass flow controller 162 so as to introduce source gas 132 at a non-linear rate. One technique for forming a desired concentration gradient layer is disclosed in greater detail below in connection with FIG. 6.

Preferably, while maintaining a constant flow rate of silane and $H_2$, the germane mixture flow rate is increased from a level of zero that produces a mixture that is 0% germane mixture (1% germane in $H_2$)/100% silane to a level that produces a mixture that is 74% germane mixture (1% germane in $H_2$)/26% silane. As a result, the Ge concentration in the first graded layer 618 increases at a rate of 5–10% per $\mu$m until the final desired Ge concentration is achieved. In the preferred embodiment, the final desired germanium concentration is 2%. Preferably, the silane flow rate1 into the deposition chamber is maintained at about 40–60 sccm and $H_2$ flow rate is maintained at about 25–45 slm.

The uniform SiGe layer 620 is then formed by CVD over the first graded SiGe layer 618 (step 574, FIG. 5(*d*)). Processor 110 controls the flow of silane, germane and hydrogen using mass flow controllers 160, 162 and 164, respectively. In one embodiment, processor 110 uses the growth rate curves calculated in step 720 (See FIG. 7) to determine the flow rates of silane 130 and germane 132 for a desired film thickness. Processor 110 introduces silane 130, germane 132 and hydrogen 134 into chamber 12.

Preferably, the hydrogen flow rate remains constant throughout the deposition and is in the range of about 5 to 70 slm. In one embodiment, processor 110 maintains the silane 130 and germane 132 flow rates constant so as to produce a mixture of about 26% silane and about 74% germane mixture (1% germane in $H_2$) with the dilutant $H_2$ flow rate of about 30–40 slm during the deposition of the uniform layer 620. Processor 110 uses the growth rates obtained for SiGe having a given Ge concentration to determine the duration of this step.

The Ge concentration in the uniform layer 620 remains constant, typically between about 2–5% Ge. Preferably, the Ge concentration in the uniform layer 620 matches the Ge concentration of the first and the second graded layers, 618 and 622, at interfaces B and C, respectively. (See FIG. 2) In other embodiments, the Ge concentration in the uniform layer 620 may be higher than that of the graded layers 618 and 620 at interfaces B and C, respectively. In this case, the index of refraction of the uniform layer 620 is higher than that of both the first and second graded layers 618 and 622. In one embodiment, the thickness of the uniform layer is in the range of about 2–5 $\mu$m.

Next, the surface of the deposited uniform layer 620 is planarized to remove those portions of the uniform layer 620, the graded layer 618 and the blocking layer 616 that lie above the plane of surfaces 610, 612. (Step 576, FIG. 5(*e*)). Such planarization may be accomplished, for example, by chemical mechanical polishing. Before performing the planarizing step, the substrate 210 is cooled and removed from the deposition chamber 12. After planarizing, the surface of the substrate 210 is cleaned using the process described in step 520. Steps 530, 540, 550, and 560 are then performed. In another embodiment, the uniform layer 620 fills only region 630 and has a flat top surface similar to surface 632 shown in FIG. 5(*e*). In this case, planarization is not needed.

Next, a second graded SiGe layer 622 is formed by CVD over uniform layer 620 (Step 578, FIG. 5(*f*)). The second graded layer 622 is formed using a technique similar to that described in step 572 for forming the first graded layer 618. The gas flow rates of relative concentrations are adjusted such that the Ge concentration in the second graded layer 622 decreases with the height of the second graded layer 622. In one embodiment, the Ge concentration profile in the second graded layer 622 is linear. However, other concentration profiles, such as those illustrated in FIGS. 3(*d*)–(*f*) are also contemplated.

During step 578, the germane mixture flow rate is decreased from 500 sccm to 0 sccm depending on the desired concentration gradient. Preferably, while maintaining silane and $H_2$ flow rates constant, the germane mixture flow rate into the deposition chamber 12 is decreased from a level that produces a mixture of 74% germane mixture (1% germane in $H_2$)/26% silane to a level of zero that produces a mixture of 0% germane mixture (1% germane in $H_2$)/100% silane. Preferably, the Ge concentration in layer 622 decreases at a rate of approximately 10% per $\mu$m until the final Ge concentration of 0% is achieved, resulting in a second graded layer 622 that is about 0.2–0.4 $\mu$m. Preferably, the $SiH_4$ flow rate into the deposition chamber is maintained at about 50 sccm and the $H_2$ flow rate is maintained at about 30–40 slm.

The second graded layer 622 is then etched to remove the SiGe deposited on surfaces 610 and 612. (Step 580, FIG. 5(*g*). Again, the substrate is cooled and removed from the deposition chamber 12. After etching, the surface of the wafer is cleaned using the process described in step 520. Steps 530, 540, 550 and 560 are then performed and an upper cladding layer 624 is deposited over the second graded layer 622 using the same process conditions as used for forming layer 618. (Step 582, FIG. 5(*h*)). The cladding layer is then planarized if needed. (Step 584, FIG. 5(*i*)).

For embodiments that contain only the graded layers and do not contain the uniform layer, steps 574 and 576 are not performed. For embodiments that contain only the uniform layer and do not include the first or second graded layers, steps 572, 578 and 580 are not performed. For the embodiments that do not include an upper cladding layer 624, steps 582 and 584 are not performed. And for embodiments that do not have a blocking layer 616, step 570 is not performed.

Forming a Concentration Gradient Layer

Figure 6:
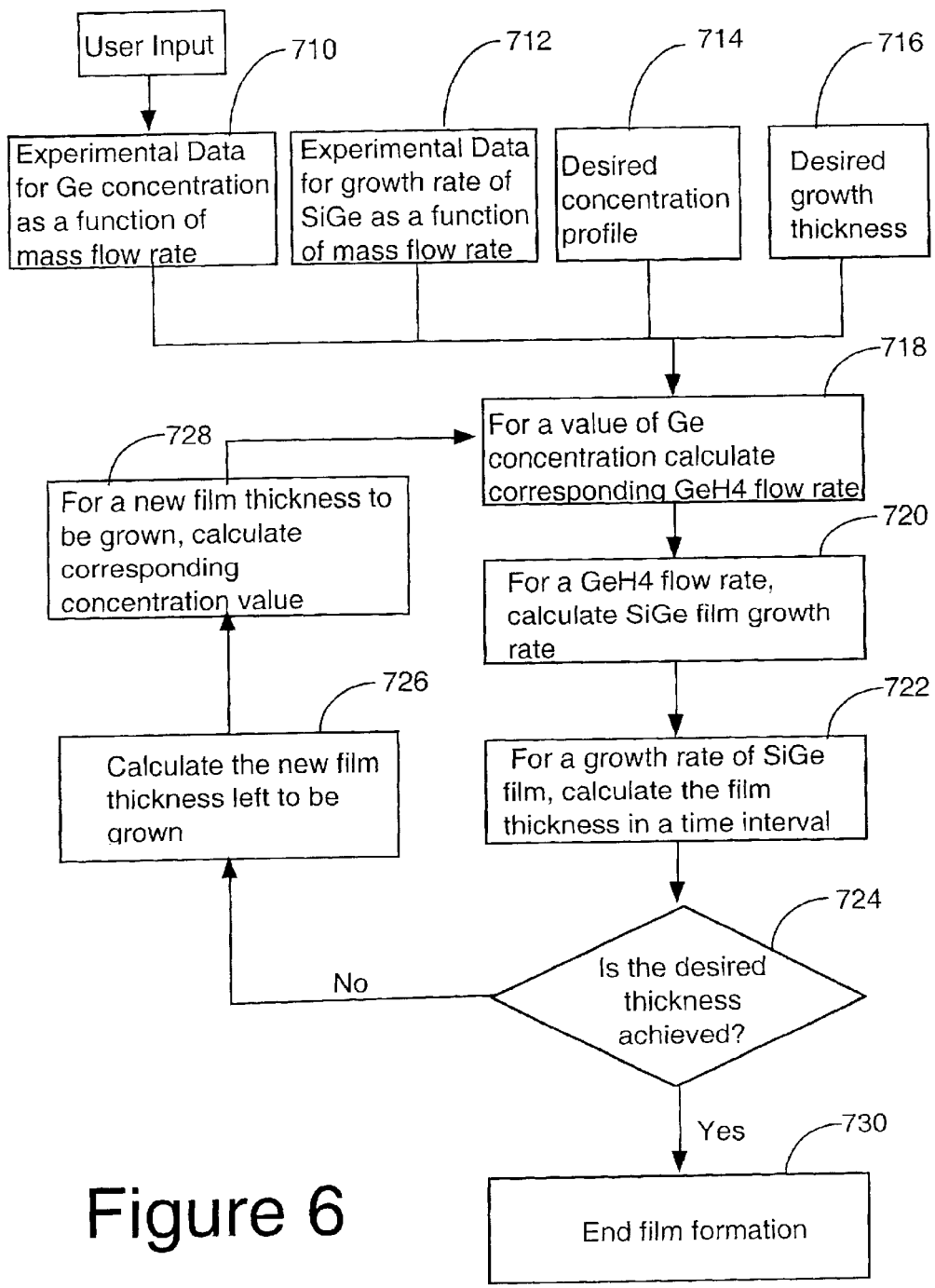
FIG. 6 is a flow chart of a process for forming a layer with a predetermined concentration profile in accordance with one embodiment of the invention.
Figure 7:
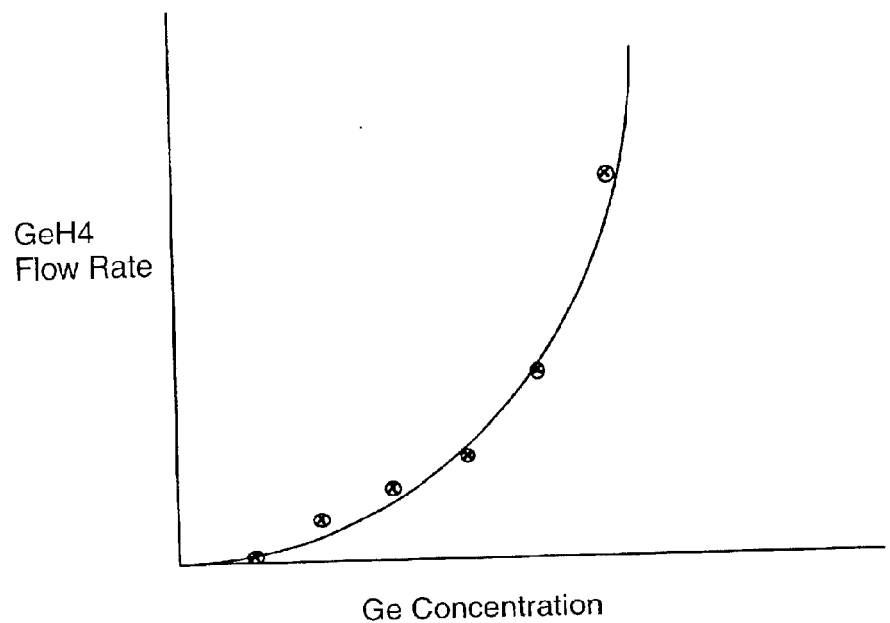
FIG. 7 illustrates a curve fit of an experimentally determined concentration of germanium of a film introduced according to six discrete flow rates and a constant silane flow rate.

FIG. 6 illustrates a flow chart for forming a layer with a predetermined concentration profile. In order to form a layer with a desired concentration profile, processor 110 determines the concentration of Ge in a film formed on a test wafer according to a plurality of flow rates of germane through mass flow controller 162. (Step 710). For each flow rate, a corresponding concentration of Ge is measured in the corresponding film formed on the test wafer. Once this data is collected for a plurality of flow rates, a curve is established through a curve fitting algorithm, such as the least square fit method using the Gauss-Jordan algorithm to calculate the coefficients of a polynomial that best fits the experimental measurements. FIG. 7 illustrates a curve fit of an experimentally determined concentration of germanium of a film introduced according to six discrete flow rates and a constant silane flow rate.

Figure 8:
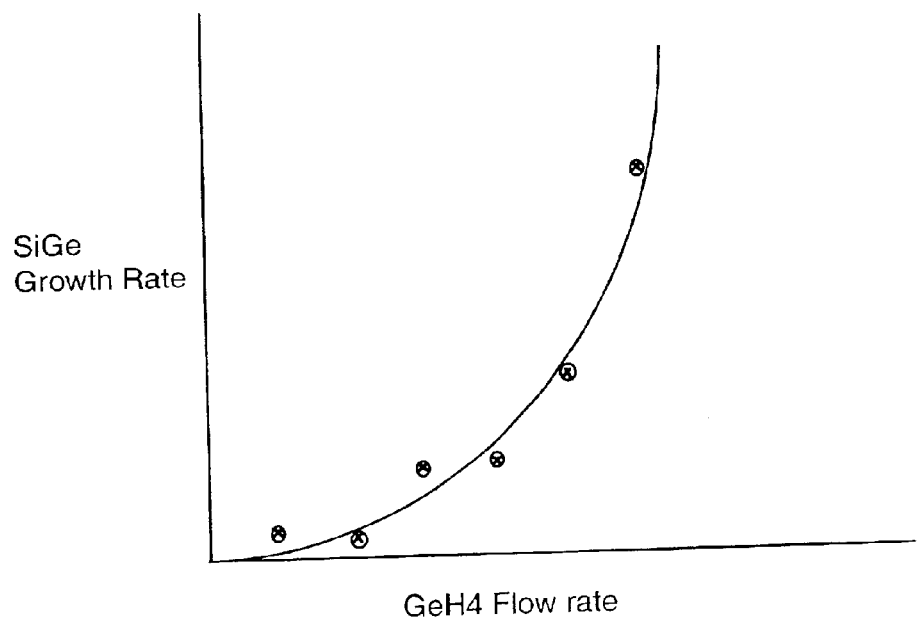
FIG. 8 illustrates an experimentally determined growth rate of SiGe in a film introduced on a substrate for six discrete germane flow rates and a constant silane flow rate.

Next, the flow rate of germane is measured against the growth rate of the SiGe film introduced on the test wafer. (Step 712) In one embodiment, the experimentally measured growth rates are measured from the same test wafer used to measure the Ge concentrations. A growth rate curve is established through a curve fitting algorithm, such as the Gauss-Jordan algorithm. FIG. 8 illustrates an experimentally determined growth rate of SiGe in a film introduced on a substrate for six discrete germane flow rates and a constant silane flow rate. Although here steps 710 and 712 are performed sequentially, those skilled in the art will appreciate that steps 710 and 712 may be performed in any order or simultaneously.

The experimentally determined data for the concentration of Ge as a function of flow rate and SiGe growth rate as a function of flow rate are entered into processor 110. To form the first graded SiGe layer, a desired concentration profile as a function of thickness is entered into processor 110. (Steps 714 and 716). Processor 110 uses the desired concentration profile over the desired thickness as a guide to calculate the set points for mass flow controller 162.

For a desired concentration, the corresponding germane flow rate is calculated from FIG. 7. (Step 718). The flow rate is then used to calculate the SiGe growth rate from FIG. 8. (Step 720). This growth rate is used along with a predetermined time interval ($\Delta t$) to determine the thickness of a SiGe film for that time interval. (Step 722). Processor 110 then introduces silane 130, germane 132 and hydrogen 134 into chamber 12. Preferably, the flow rates of silane 130 and hydrogen 134 are the same as those used to calculate the germane flow rate and the SiGe growth rate. The germane flow rate is the flow rate calculated from the concentration data points.

The deposited SiGe film thickness is then subtracted from the total desired thickness to establish the thickness left to be grown. (Step 726). The new thickness and the desired input concentration profile as a function of thickness is used to calculate a new SiGe concentration value. (Step 728). The above process is repeated for this new concentration value for a second time interval. This iterative process is continued until the total desired thickness is achieved.

Calculating the Flow Rate and Deposition Time For a Species

Calibration of processor 110 is performed by measuring the thicknesses of a species, such as silicon, on a test substrate for a plurality of flow rates of the source gas and deposition times. For example, to determine the growth rate of silicon, processor 110 measures the thickness of silicon layers for a plurality of flow rates of silane.

Processor 110 then determines the thickness as a function of flow rate using curve fitting techniques known in the art, such as least square curve fitting using Gauss-Jordan algorithms (See FIG. 7 described in greater detail below). Processor 110 then uses this curve to calculate the appropriate flow rate and deposition time to form a silicon layer of desired thickness. Where the operator specifies a specific flow rate and thickness, processor 110 uses the curve to determine the time interval required to form a silicon layer of a specified thickness.

Figure 9:
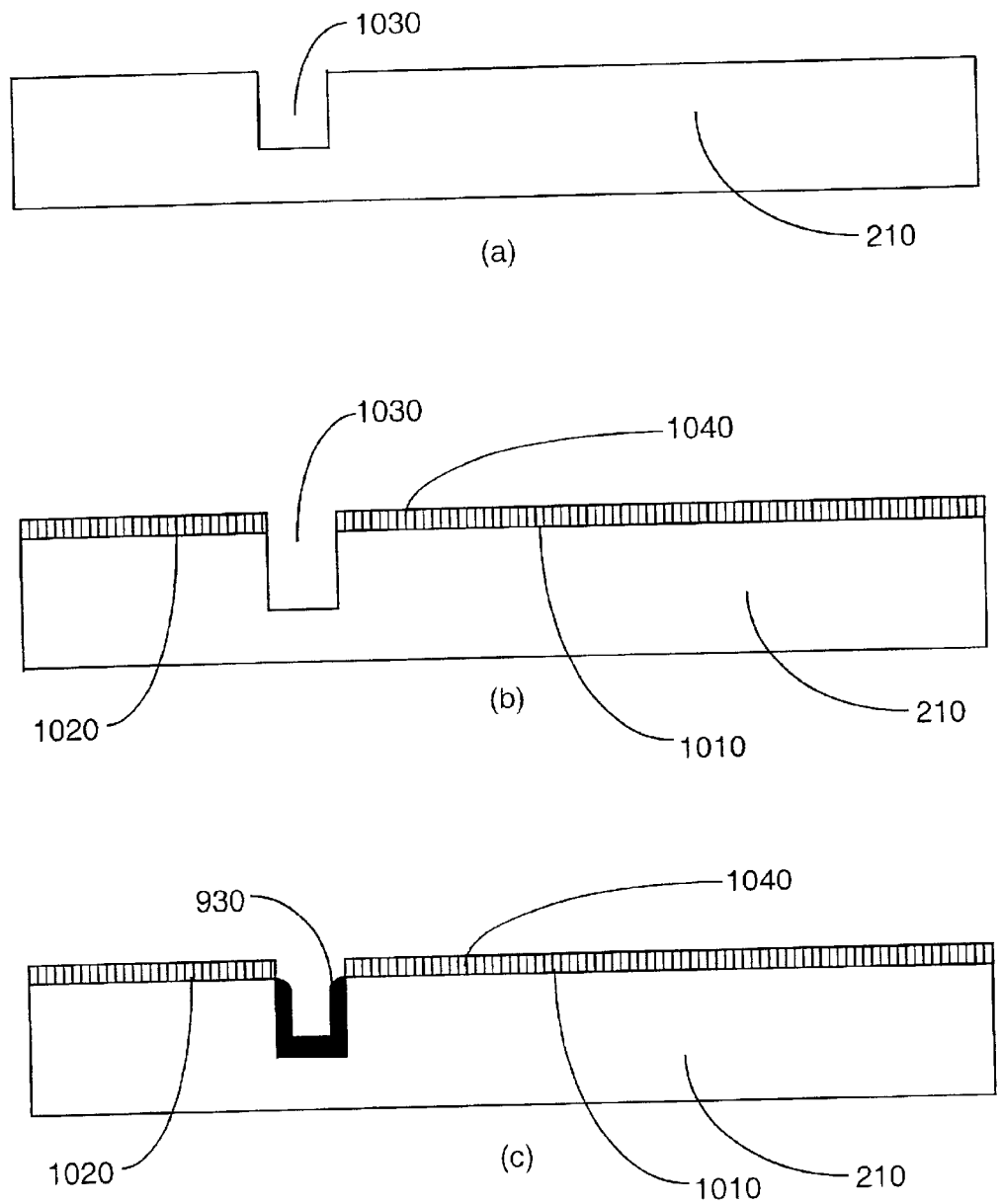
FIG. 9 illustrates a selective deposition technique for fabricating waveguide structures in accordance with an embodiment of the invention.
Figure 9:
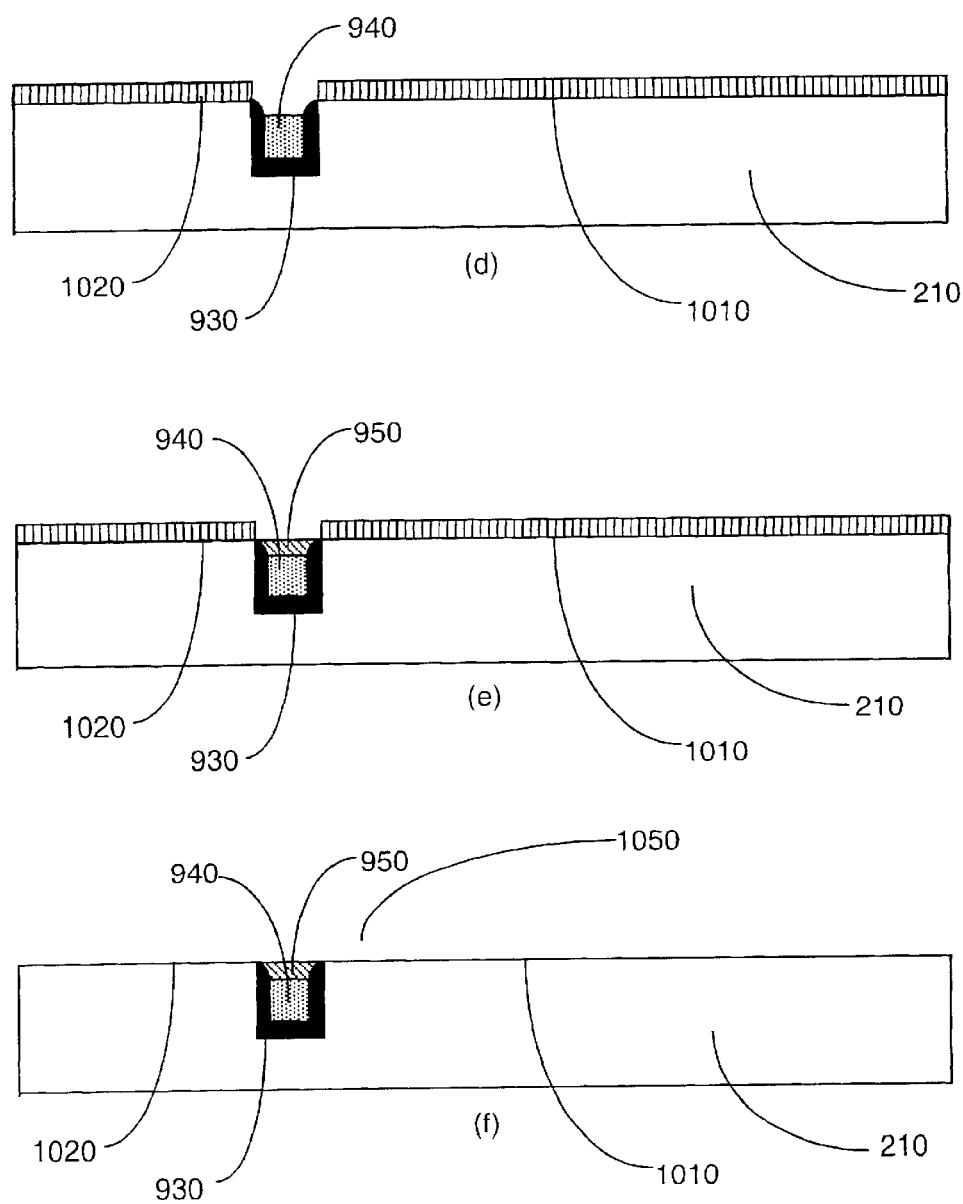

FIG. 9 illustrates a selective CVD deposition technique for fabricating waveguide structures in accordance with another embodiment of the invention. Generally, in a selective CVD deposition technique, the deposition occurs only on certain regions of the substrate. This is achieved by depositing an oxide layer 1040 on regions where deposition is not needed.

An etchant gas, such as hydrogen chloride, is introduced into the deposition chamber during the deposition process. The etchant gas removes the deposited layer as it is formed on the substrate. The etch rate and the deposition rate for regions covered by the oxide layer are not the same as the etch rate and the deposition rate for regions not covered by the oxide layer. Thus, selecting the growth conditions such that the deposition rate is lower than the etch rate on the oxide surfaces while the deposition rate is higher than the etch rate on the non-oxide surfaces, results in film deposition only on regions that are not covered by the oxide layer.

For example, to deposit a layer of SiGe only in region 1030 (FIG. 9), surfaces 1010 and 1020 are covered with an oxide layer 1040. The growth conditions are selected such that the rate of deposition of SiGe on the oxide covered surfaces 1010 and 1020 is lower than the rate at which the deposited SiGe is etched from surfaces 1010 and 1020 by the hydrogen chloride. Further, the growth conditions are selected such that the deposition rate of SiGe in region 1030 is higher than the rate at which SiGe is etched in region 1030. Resulting in a SiGe deposition in region 1030 and no SiGe deposition on surfaces 1010 and 1020.

To form a waveguide structure in accordance with the invention, a pattern is etched into the substrate 210 using, for example, the method described earlier in steps 510 and 515 (FIG. 5 and FIG. 9(a)). Using commonly known techniques in the art, an oxide layer 1040 is then deposited on surfaces where either Si or SiGe deposition is not needed, e.g. surfaces 1010 and 1020 of the patterned etched substrate. (FIG. 9(b)). The oxide layer 1040 allows deposition in region 1030 without deposition on surfaces 1010 and 1020.

Next, the substrate 210 is cleaned as described in step 520. (FIG. 5). Steps 530 thru 550 are then performed as described earlier. The first graded layer 930, the uniform layer 940, and the second graded layer 950 are then deposited in region 1030 using the techniques described earlier in steps 572, 574, and 578, respectively. (FIG. 5 and FIGS. 9(c)–9(e)).

Preferably, the source gases for the formation of the waveguide structure are germane, dichlorosilane, hydrogen chloride, and hydrogen. The relative concentrations of these gases, the temperature and the pressure are selected such that the deposition rate of Si and SiGe in regions 1010 and 1020 is lower than the etch rates of Si and SiGe in those regions while the deposition rate of Si or SiGe in region 1030 is higher than the etch rate of Si or SiGe in region 1030. After the waveguide structure is deposited, the oxide layer 1040 is removed using techniques known in the art (FIG. 9(f)).

Although the embodiment shown in FIG. 9 does not show a blocking layer or an upper cladding layer, those skilled in the art will appreciate that embodiments containing the blocking and cladding layers in addition to the first graded layer 1060, the uniform layer 1062 and the second graded layer 1064 may be formed using the process described above. For embodiments that contain only the graded layers, 1060 and 1064 and not the uniform layer 1062, steps 574 and 576 are not performed. For embodiments that contain only the uniform layer 1062 and do not include the first or second graded layers 1060 and 1064, steps 572, 578 and 580 are not performed. For embodiments that do not include an upper cladding layer, steps 582 and 584 are not performed. And for embodiments that do not have a blocking layer, step 570 is not performed.

Figure 10:
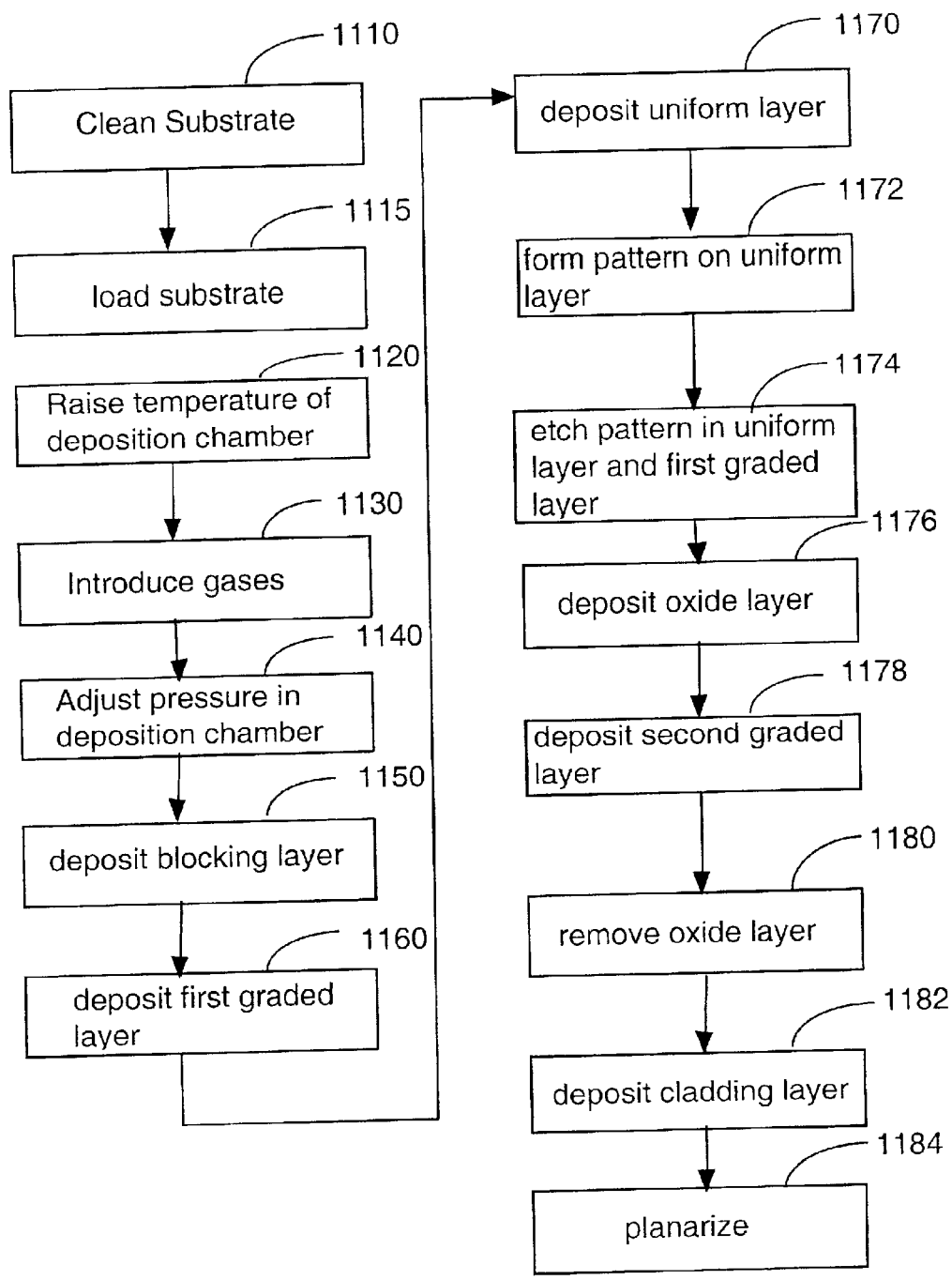
FIG. 10 is a flow chart of the processing steps used to fabricate a waveguide structure using another embodiment of the invention.
Figure 11:
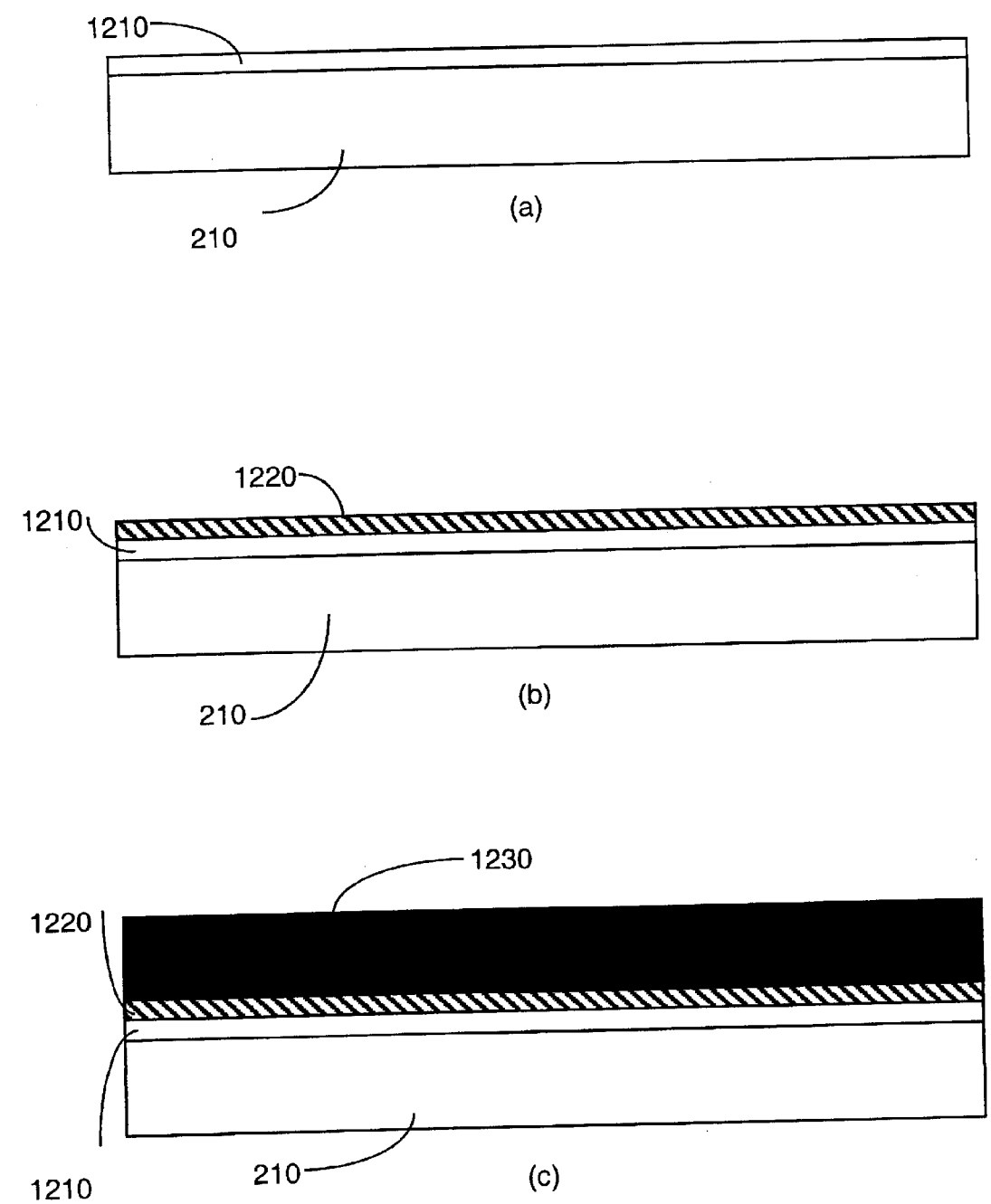
FIG. 11 illustrates schematic cross sections of the waveguide structure at some of the processing steps of FIG. 10.
Figure 11:
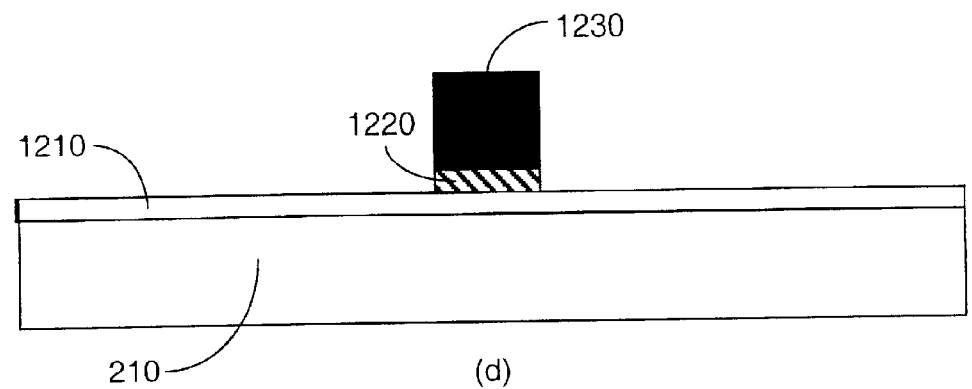
Figure 11:
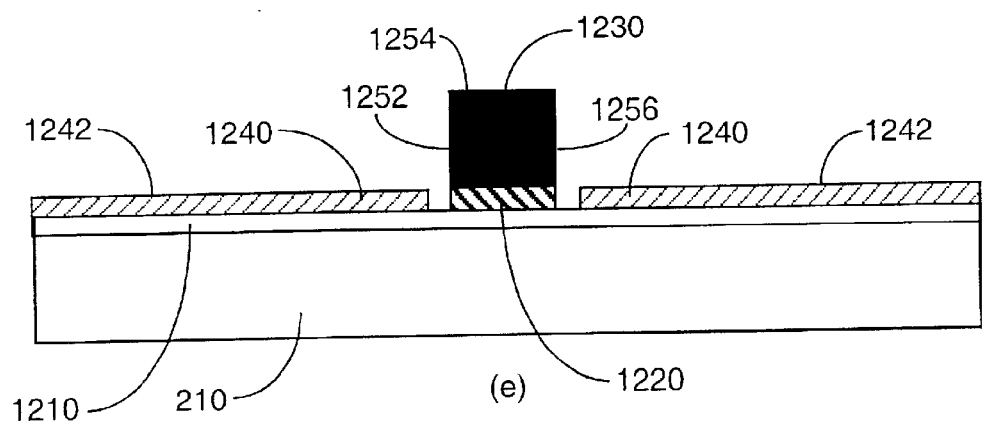
Figure 11:
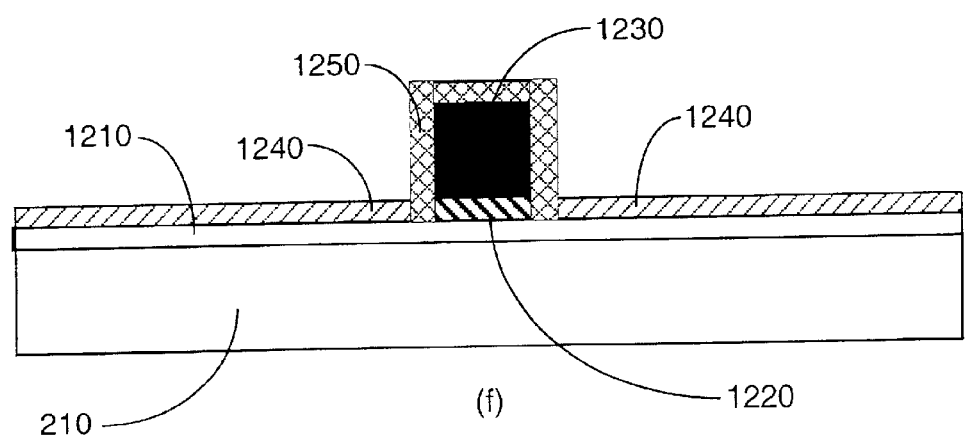
Figure 11:
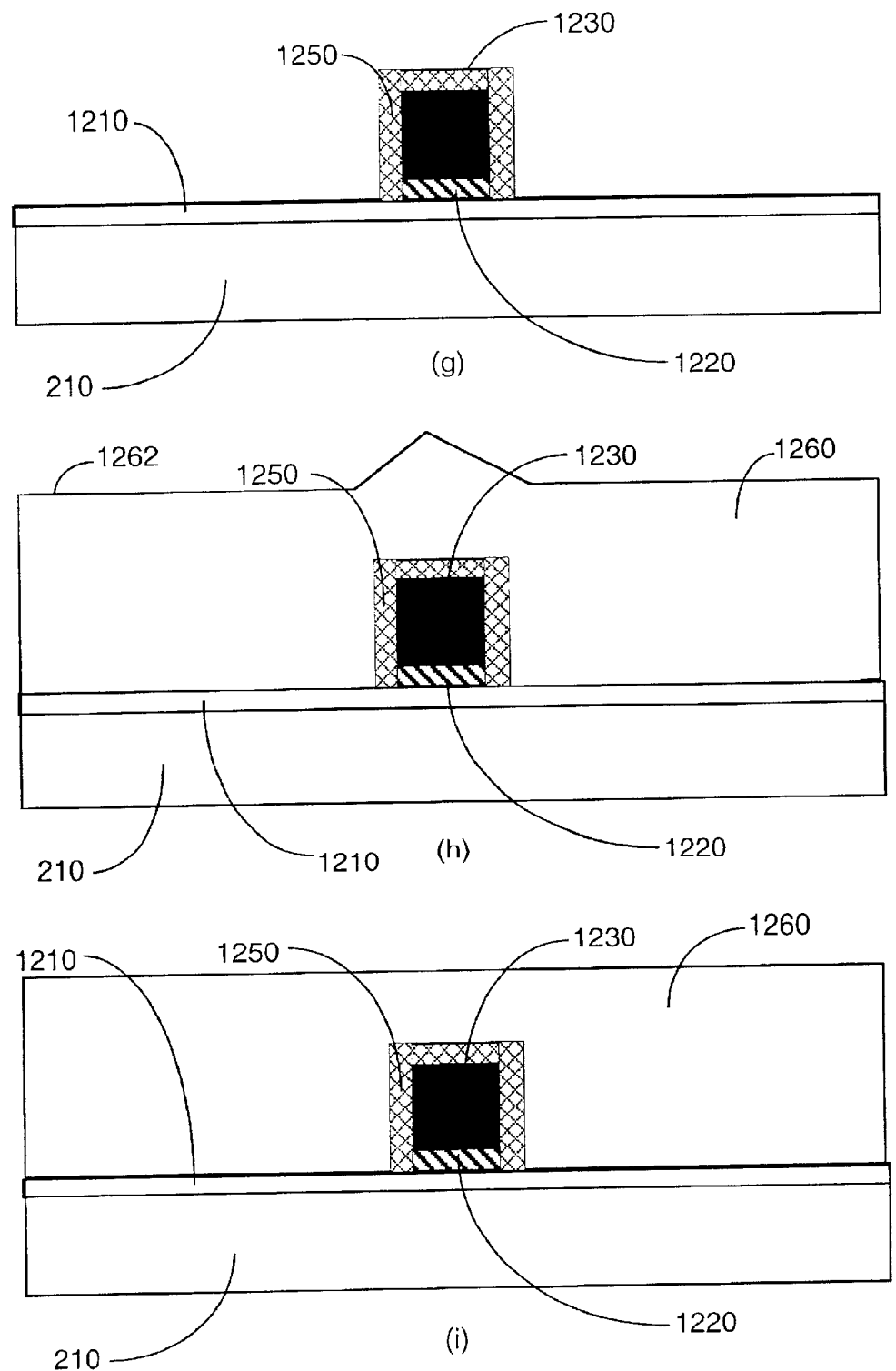

FIGS. 10 and 11 illustrate another technique for fabricating waveguide structures in accordance with the invention. FIG. 10 shows the processing steps that may be executed to form a waveguide structure. FIG. 11 illustrates schematic cross sections of the waveguide structure at some of the processing steps of FIG. 10. Steps 1110–1140 are performed using similar techniques as described in steps 510–560 of FIG. 4. A blocking layer 1210 is next deposited on substrate 210 using CVD. (Step 1150, FIG. 11 (a)). A first graded layer 1220 is then formed over the blocking layer 1210. (Step 1160, FIG. 11(b)). Next, the uniform layer 1230 is formed on the first graded layer 1220. (Step 1170, FIG. 11(c)). The methods for forming the blocking layer 1210, the first graded layer 1220 and the uniform layer 1230 are similar to those described earlier in connection with FIGS. 5 and 6.

After the uniform layer 1230 is formed, the substrate 210 is cooled and removed from chamber 12. A pattern is formed over the uniform layer 1230 using techniques known in the art. (Step 1172). The uniform layer 1230 and the first graded layer 1220 are then etched using techniques known in the art. (Step 1174, FIG. 11(d)). The etched patterned substrate is then cleaned using techniques similar to those described earlier in step 520 (FIG. 4) and placed in chamber 12. Steps 1115–1140 are performed again. An oxide layer 1240 is next deposited over blocking layer 1210 as shown in FIG. 11 (e).

(Step 1176). The oxide layer 1240 is formed by introducing a silicon gas source and oxygen into chamber 12.

A second graded layer is then formed around the etched patterned uniform layer 1230 and graded layer 1220 as shown in FIG. 11(f). (Step 1178). The flow rates of the gases (silane, germane, hydrogen and hydrogen chloride), the temperature, and the pressure are selected such that the second graded layer 1250 is only formed around surfaces 1252, 1254, and 1256 (FIG. 11(e)). The deposition rate on surfaces 1252, 1254, and 1256 is higher than the etch rate on those surfaces. Additionally, the flow rates of the gases (silane, germane, hydrogen and hydrogen chloride), the temperature, and the pressure are selected such that a second graded layer is not formed on oxide surfaces 1242 by selecting these parameters so that the deposition rate on surfaces 1242 is lower than the etch rate on surfaces 1242.

The oxide layer 1240 is then removed using techniques known in the art. (Step 1180, FIG. 11(g)). A cladding layer 1260 is then formed over the second graded layer 1250 and the blocking layer 1210, as shown in FIG. 11(h). (Step 1182). The surface of the cladding is then planarized to form the structure shown in FIG. 11(i). In other embodiments, the planarization step may not be necessary where the cladding layer is grown so as to form a flat surface 1262 (see FIG. 11(h)) or where a flat surface 1262 is not required.

For embodiments that contain only the graded layers and not the uniform layer, step 1170 is not performed. In this embodiment, steps 1172 and 1174 are performed immediately after step 1160. For embodiments that contain only the uniform layer 1230 and do not include the first or second graded layers 1220 and 1250, steps 1160, 1176, 1178 and 1180 are not performed. For the embodiments that do not include an upper cladding layer 1260, steps 1182 and 1184 are not performed. And for embodiments that do not have a blocking layer 1210, step 1150 is not performed.

Figure 12:
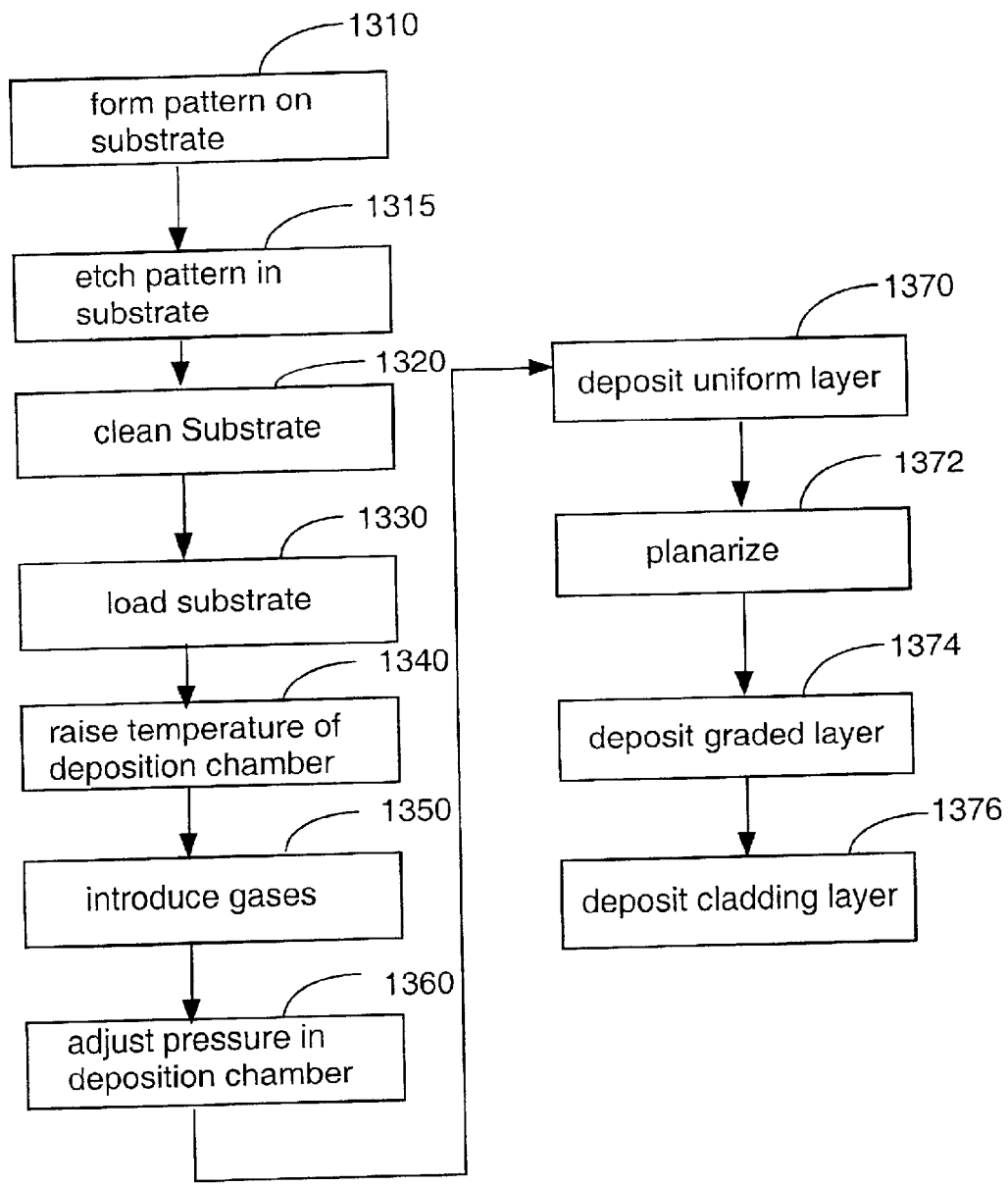
FIG. 12 is a flow chart of the processing steps used to fabricate a waveguide structure using yet another embodiment of the invention.
Figure 13:
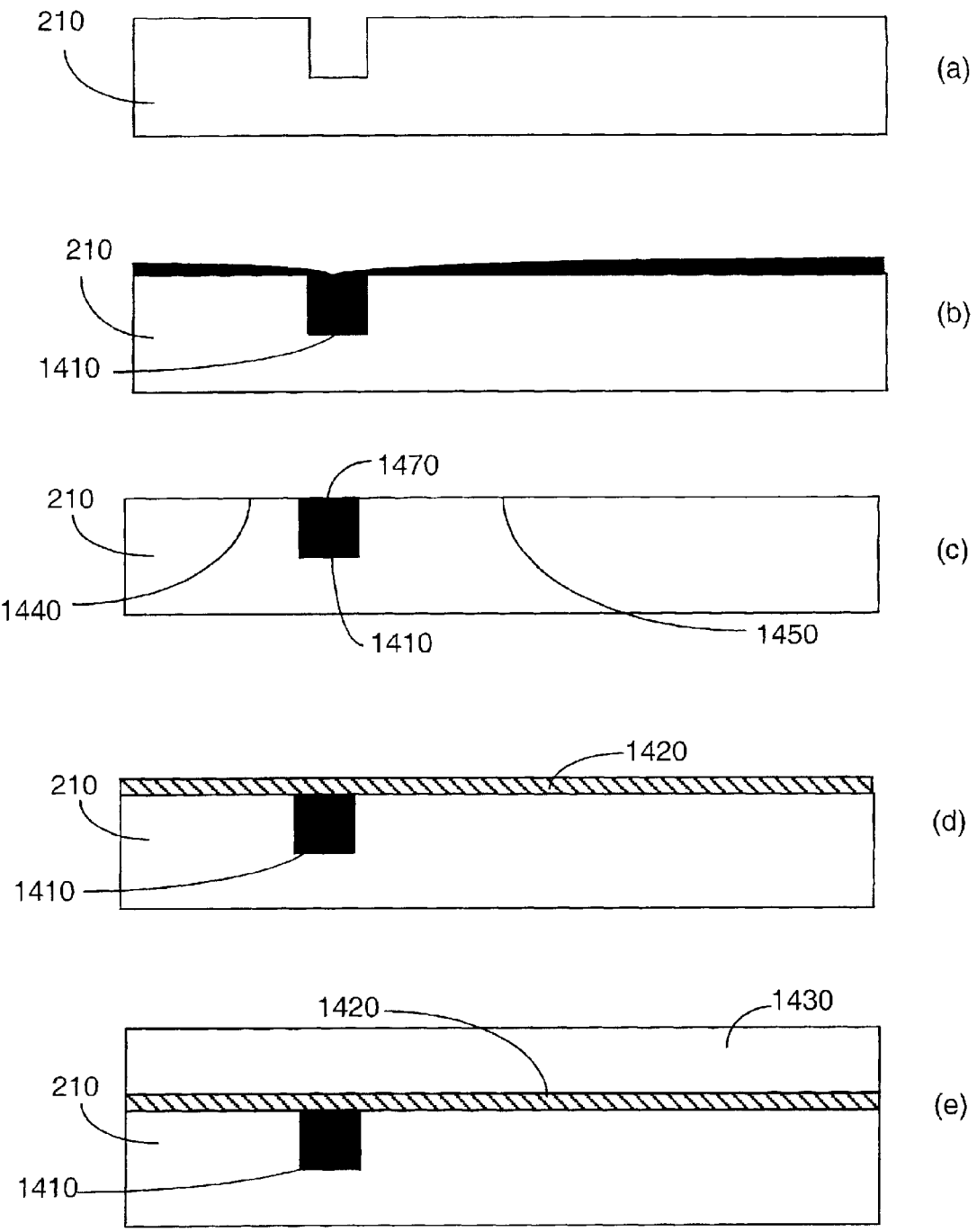
FIG. 13 illustrates schematic cross sections of the waveguide structure at some of the processing steps of FIG. 12.

FIGS. 12 and 13 illustrate yet another technique for fabricating waveguide structures in accordance with the invention. FIG. 12 shows the processing steps that are executed to form a waveguide structure in accordance with this embodiment. FIG. 13 illustrates schematic cross sections of the waveguide structure at some of the processing steps of FIG. 12. Steps 1310–1360 are performed using techniques similar to those described in steps 510–560 in connection with FIG. 4. Next, a uniform layer 1410 is formed epitaxially by CVD on substrate 210. (Step 1370, FIG. 13(b)). The method for forming the uniform layer 1410 is similar to that described earlier in step 574 in connection with FIGS. 4 and 5.

After the uniform layer 1410 is formed, the substrate 210 is cooled and removed from chamber 12. The surface of the deposited uniform layer 1410 is then planarized to remove those portions of the uniform layer 1410 that lie above the plane of surfaces 1440 and 1450. (Step 1372, FIG. 13(c)). Such planarization may be accomplished using techniques commonly known in the art, such as, chemical mechanical polishing. After planarizing, the surface of the substrate 210 is cleaned using the process described earlier in step 520. Steps 1330, 1340, 1350, and 1360 are then performed. In another embodiment, the uniform layer 1410 is formed by filling only region 1460 and has a flat top surface similar to surface 1470 shown in FIG. 13(c). In this case, planarization is not needed.

A graded layer 1420 is then formed epitaxially by CVD over uniform layer 1410 as shown in FIG. 13(d). (Step 1374). The method for forming the graded layer 1420 is similar to that described earlier in step 578 in connection with FIGS. 4 and 5. The gas flow rates of relative concentrations of silane and germane are adjusted such that the Ge concentration in the graded layer 1420 decreases with the height of the graded layer 1420. In one embodiment, the Ge concentration profile in the graded layer 1420 is linear. However, other concentration profiles, such as those illustrated in FIGS. 3(d)–(f) are also contemplated.

Next, a cladding layer 1430 is formed epitaxially by CVD over the second graded layer 1420. (Step 1376). The method for forming the cladding layer 1430 is similar to that described earlier in step 582 in connection with FIGS. 4 and 5.

The structure described immediately above does not include a transition layer between the substrate 210 and the uniform layer 1410. The concentration of Ge almost instantaneously increases from about 0% in the substrate 210 to its percentage (typically, about 2–5%) in uniform layer 1410. In this case, the growth conditions, i.e. desired temperature, pressure and concentrations of constituent gases for achieving the desired Ge concentration are established almost instantaneously.

Other embodiments may include a transition layer formed epitaxially between the substrate 210 and the uniform layer 1410, such as a transition layer similar to the first graded layer 618 described earlier in connection with FIG. 4 (step 572) and FIG. 5 (e). In one embodiment, the gradient of the layer is such that the concentration of Ge increases from about 0% to about 2–5% at a rate of about 10% per $\mu$m, forming a transition layer that is about 0.2–0.5 $\mu$m thick. During formation, the flow rate of source gas 132 is gradually increased, such that the Ge concentration in the transition layer increases at a rate of about 10% per $\mu$m.

In yet other embodiments, the Ge concentration may increase very rapidly, forming a very thin transition layer, e.g. the transition layer, for example, may be only about 0.01 $\mu$m to about 0.05 $\mu$m thick. For example, to form a 0.01 $\mu$m thick transition layer where the Ge concentration increases from about 0% to about 2%, the Ge concentration in the transition layer must increase at a rate of about 200% per $\mu$m. This is achieved by increasing the flow rate of source gas 132 very rapidly.

Similarly, in one embodiment, the Ge concentration in the graded layer 1420 may be decreased very rapidly in a manner similar to that described immediately above for the transition layer. In this case, the graded layer 1420 is very thin and may be only 0.01 $\mu$m to 0.05 $\mu$m thick.

In yet another embodiment, the waveguide structure may be formed by forming the cladding layer 1430 immediately over the uniform layer 1410. In this case, the structure does not include a graded layer 1420 and step 1374 is not performed. The Ge concentration profile is similar to that shown in FIG. 3(b). That is, the Ge concentration immediately decreases from its percentage in the uniform layer 1410 to 0% in the upper cladding 1430.

While the present invention has been described with reference to a few specific embodiments, the description is illustrative of the invention and is not to be construed as limiting the invention. For example, the waveguide structure disclosed is a SiGe waveguide structure but those skilled in the art can appreciate that the processes disclosed may be employed for waveguide structures made of other materials. Further, various modifications of the structures described may occur to those skilled in the art without departing from the true spirit and scope of the invention as defined by the appended claims.

What is claimed is:

1. A method of forming a planar waveguide structure, comprising:

forming a first graded layer on a substrate, the first graded layer comprising silicon and germanium wherein the germanium concentration increases with the height of the first graded layer; and forming a second graded layer immediately over the first graded layer, the second graded layer comprising silicon and germanium wherein the germanium concentration decreases with the height of the second graded layer.

2. The method of claim 1 further comprising forming a blocking layer between the substrate and the first graded layer wherein the blocking layer prevents contaminants from the substrate from diffusing into the first or the second graded layers.

3. The method of claim 2 wherein the blocking layer comprises epitaxial silicon.

4. The method of claim 1 further comprising forming a cladding layer on the second graded layer.

5. The method of claim 4 wherein the cladding layer comprises epitaxial silicon.

6. The method of claim 1 wherein the germanium concentration in the first graded layer increases linearly.

7. The method of claim 1 wherein the germanium concentration in the graded layer increases from about 0% germanium to about 2–5% germanium at a rate between about 0.1% per $\mu$m to about 10% per $\mu$m.

8. The method of claim 1 wherein the germanium concentration in the first graded layer increases from about 0% germanium to about 2% germanium at a rate of about 10% per $\mu$m.

9. The method of claim 1 wherein the germanium concentration in the second graded layer decreases linearly.

10. The method of claim 1 wherein the germanium concentration in the second graded layer decreases from about 2–5% germanium to about 0% germanium at a rate between about 0.1% per $\mu$m to about 10% per $\mu$m.

11. The method of claim 1 wherein the germanium concentration in the second graded layer decreases from about 2% germanium to about 0% germanium at a rate of about 10% per $\mu$m.

12. The method of claim 1 wherein the layers are formed by a chemical vapor deposition process.

13. The method of claim 12 wherein the layers are formed epitaxially.

14. The method of claim 12 wherein the chemical vapor deposition process is a low pressure chemical vapor deposition process.

15. The method of claim 1 wherein the planar waveguide structure is formed using a selective deposition technique.

16. The method of claim 12 wherein the chemical vapor deposition process comprises:

introducing into a deposition chamber a first source gas for forming silicon film on a substrate;

introducing into a deposition chamber a second source gas for forming SiGe film on a substrate; and introducing $H_2$ into the deposition chamber while maintaining a determined pressure and temperature in the deposition chamber.

17. The method of claim 16 wherein the first source gas is silane, disilane, trisilane, dichlorosilane, or trichlorosilane.

18. The method of claim 16 wherein the second source gas is germane or digermane.

19. The method of claim 16 wherein the first source gas is silane and the second source gas is germane.

20. The method of claim 16 wherein the chemical vapor deposition process for forming the first and second graded layers comprises:

controlling the flow rate of the second source gas according to a determined concentration profile of Ge on a substrate; and forming a film on a substrate, the film comprising Ge at a first concentration at a first point in the film and a second concentration different from the first concentration at a second point in the film.

21. The method of claim 20 wherein the concentration profile is determined by:

determining a concentration of Ge formed on a substrate for a plurality of flow rates;

determining a growth rate of SiGe on a substrate for a second plurality of flow rates;

determining a concentration profile of Ge for a unit of time; and controlling the flow rate to form film at a graded concentration of Ge throughout the thickness of the film.

22. The method of claim 1 further comprising:

forming a pattern on the first graded layer; and etching the patterned first graded layer before forming the second graded layer on the first graded layer.

23. A computer readable medium comprising executable program instructions that when executed cause a digital processing system to perform a method comprising:

forming a first graded layer on a substrate, the first graded layer comprising silicon and germanium wherein the germanium concentration increases with the height of the first graded layer; and forming a second graded layer immediately over the first graded layer, the second graded layer comprising silicon and germanium wherein the germanium concentration decreases with the height of the second graded layer.

24. The computer readable medium of claim 23 wherein the executable program instructions include instructions for forming layers using a chemical vapor deposition process.

25. The computer readable medium method of claim 24 wherein the chemical vapor deposition process comprises executable program instructions for:

introducing into a deposition chamber a first source gas for forming silicon film on a substrate;

introducing into the deposition chamber a second source gas for forming SiGe film on a substrate; and introducing $H_2$ into the deposition chamber while maintaining a determined pressure and temperature in the deposition chamber.

26. The computer readable medium of claim 23 wherein the executable program instructions for forming the first and second graded layers comprises instructions for:

controlling the flow rate of the second source gas according to a determined concentration profile of Ge on a substrate;

forming a film on a substrate, the film comprising Ge at a first concentration at a first point in the film and a second concentration different from the first concentration at a second point in the film.

27. The computer readable medium of claim 26 wherein the executable program instructions for determining the concentration profile comprise instructions for:

determining a concentration of Ge formed on the substrate for a plurality of flow rates;

determining a growth rate of SiGe on the substrate for a second plurality of flow rates;

determining a concentration profile of Ge for a unit of time; and controlling the flow rate to form film at a graded concentration of Ge throughout the thickness of the film.

28. The computer readable medium of claim 23 wherein the executable program instruction include instructions for forming the layers epitaxially.

29. A method of forming a planar waveguide structure, comprising:

forming a first graded layer on a substrate, wherein the first graded layer comprises a first and a second optical material, wherein the concentration of the first optical material and the index of refraction of the first graded layer increases with the height of the first graded layer; and forming a second graded layer immediately over the first graded layer, the second graded layer comprising the first and second optical materials wherein the concentration of the first optical material and the index of refraction of the second layer decreases with the height of the second graded layer.

* * * * *

UNITED STATES PATENT AND TRADEMARK OFFICE
CERTIFICATE OF CORRECTION

PATENT NO. : 6,770,134 B2
DATED : August 3, 2004
INVENTOR(S) : Maydan et al.

It is certified that error appears in the above-identified patent and that said Letters Patent is hereby corrected as shown below:

Column 6,
Line 30, delete "," before "thick".

Column 16,
Line 38, after "medium" delete "method".

Signed and Sealed this

Eleventh Day of October, 2005

JON W. DUDAS
*Director of the United States Patent and Trademark Office*